Oct. 6, 1953

H. G. ALLEN ET AL 2,654,520

BAND-APPLYING MACHINE

Filed March 31, 1947

INVENTORS
HOWARD G. ALLEN
GEORGE E. GAMPP
HARRY D. SMITH

BY James D. Bock

ATTORNEY

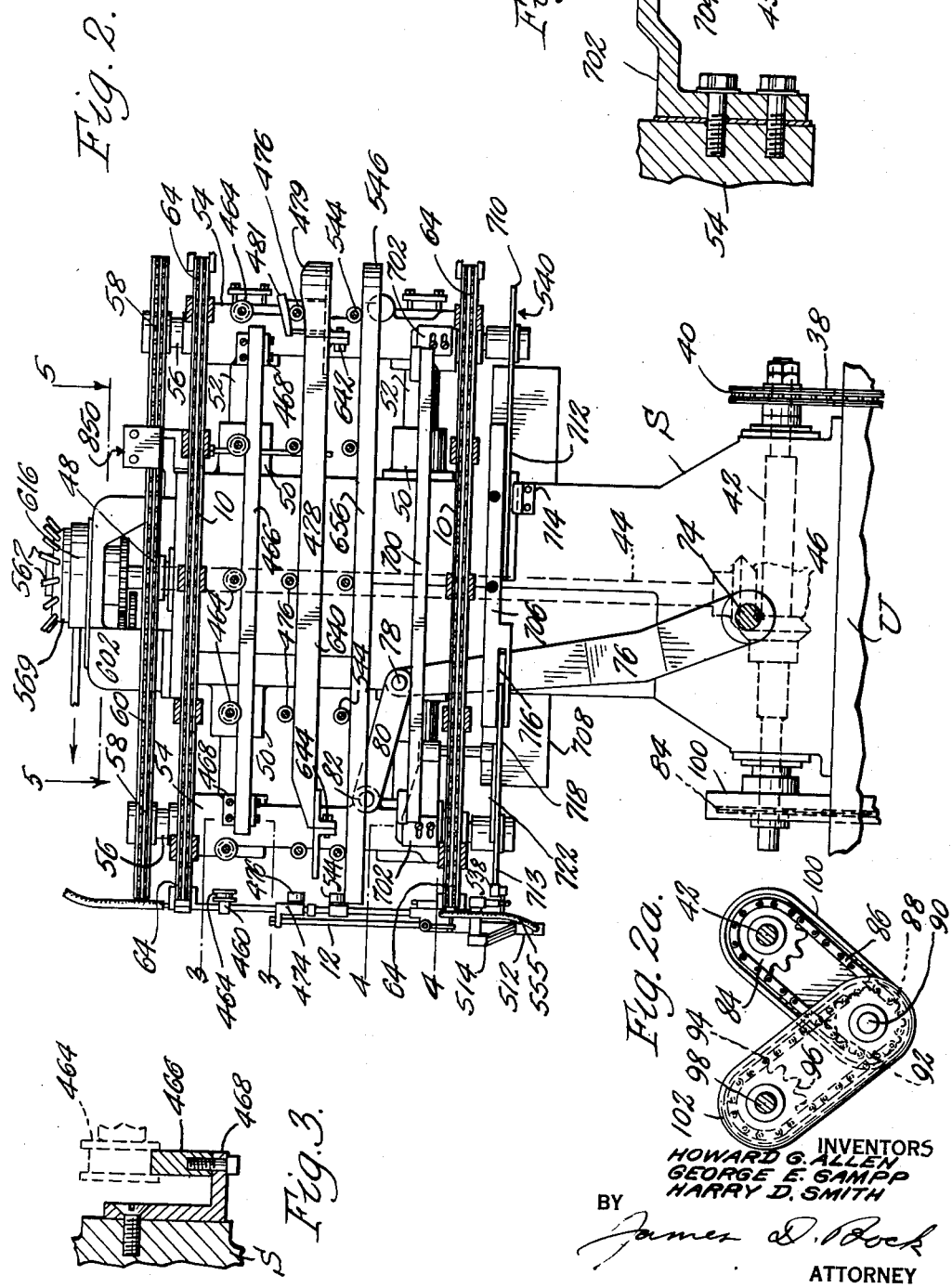

Oct. 6, 1953 — H. G. ALLEN ET AL — 2,654,520
BAND-APPLYING MACHINE
Filed March 31, 1947 — 24 Sheets-Sheet 3
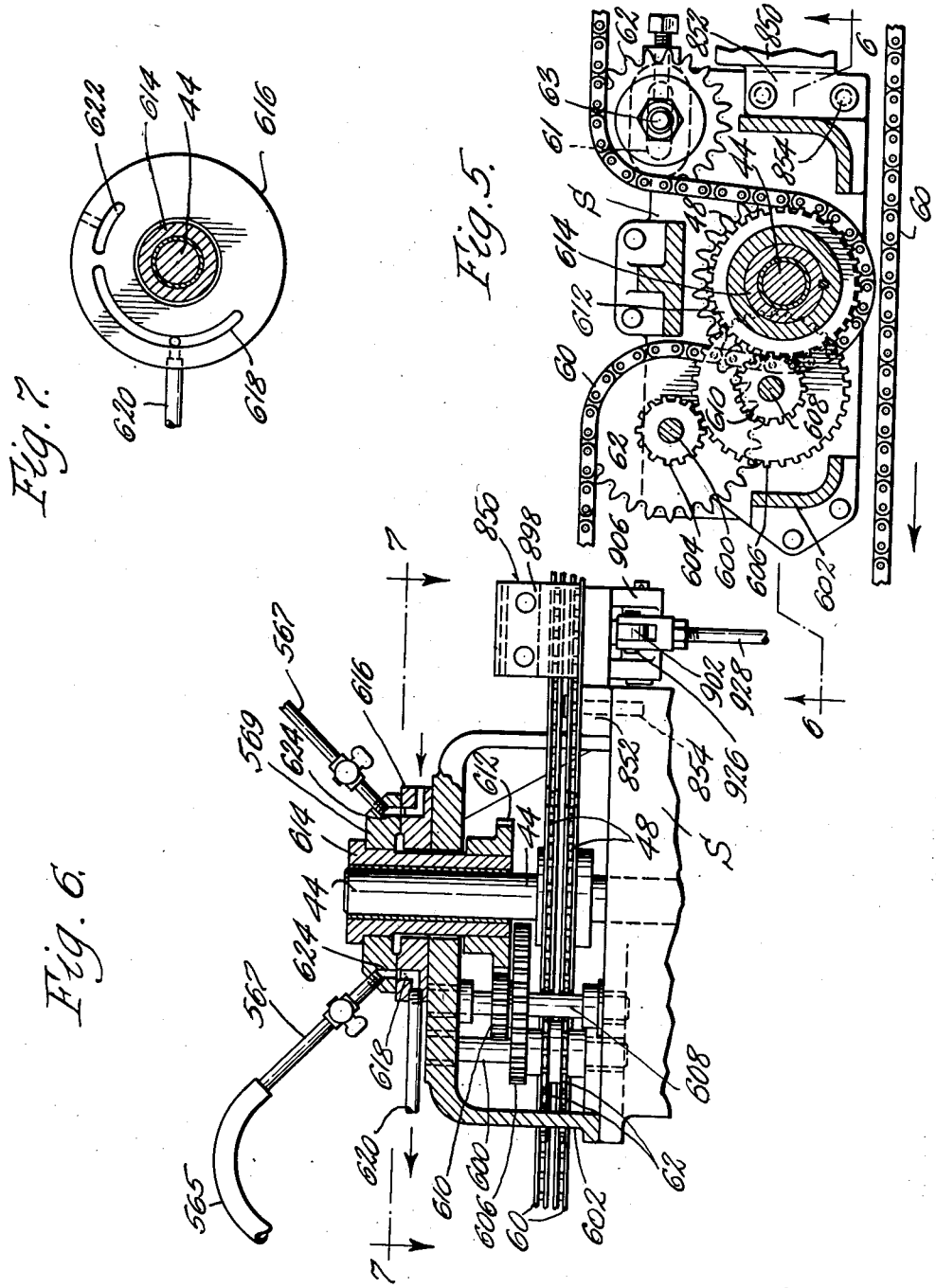
INVENTORS
HOWARD G. ALLEN
GEORGE E. GAMPP
HARRY D. SMITH
BY James D. Bock
ATTORNEY

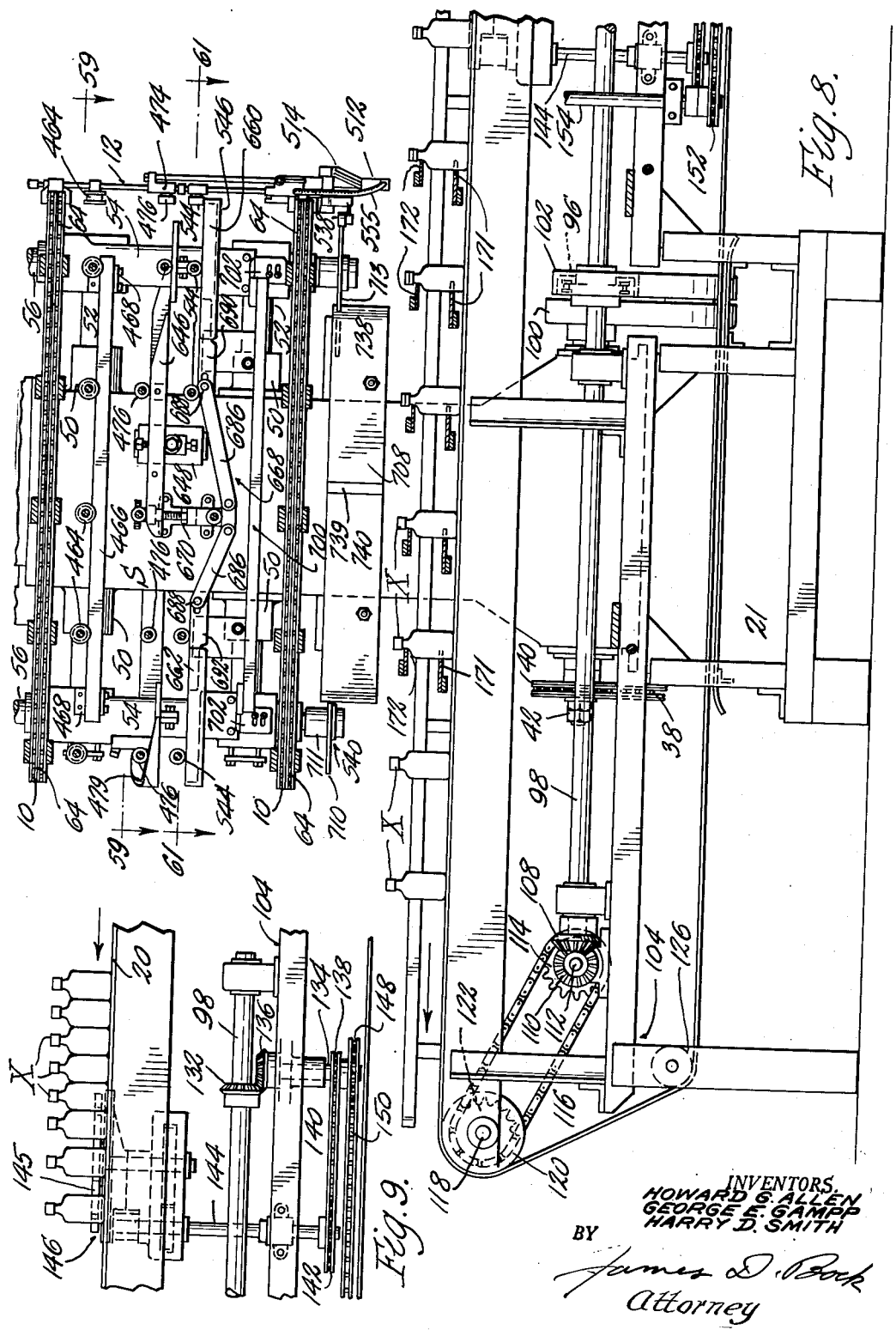

Oct. 6, 1953    H. G. ALLEN ET AL    2,654,520
BAND-APPLYING MACHINE
Filed March 31, 1947    24 Sheets-Sheet 5
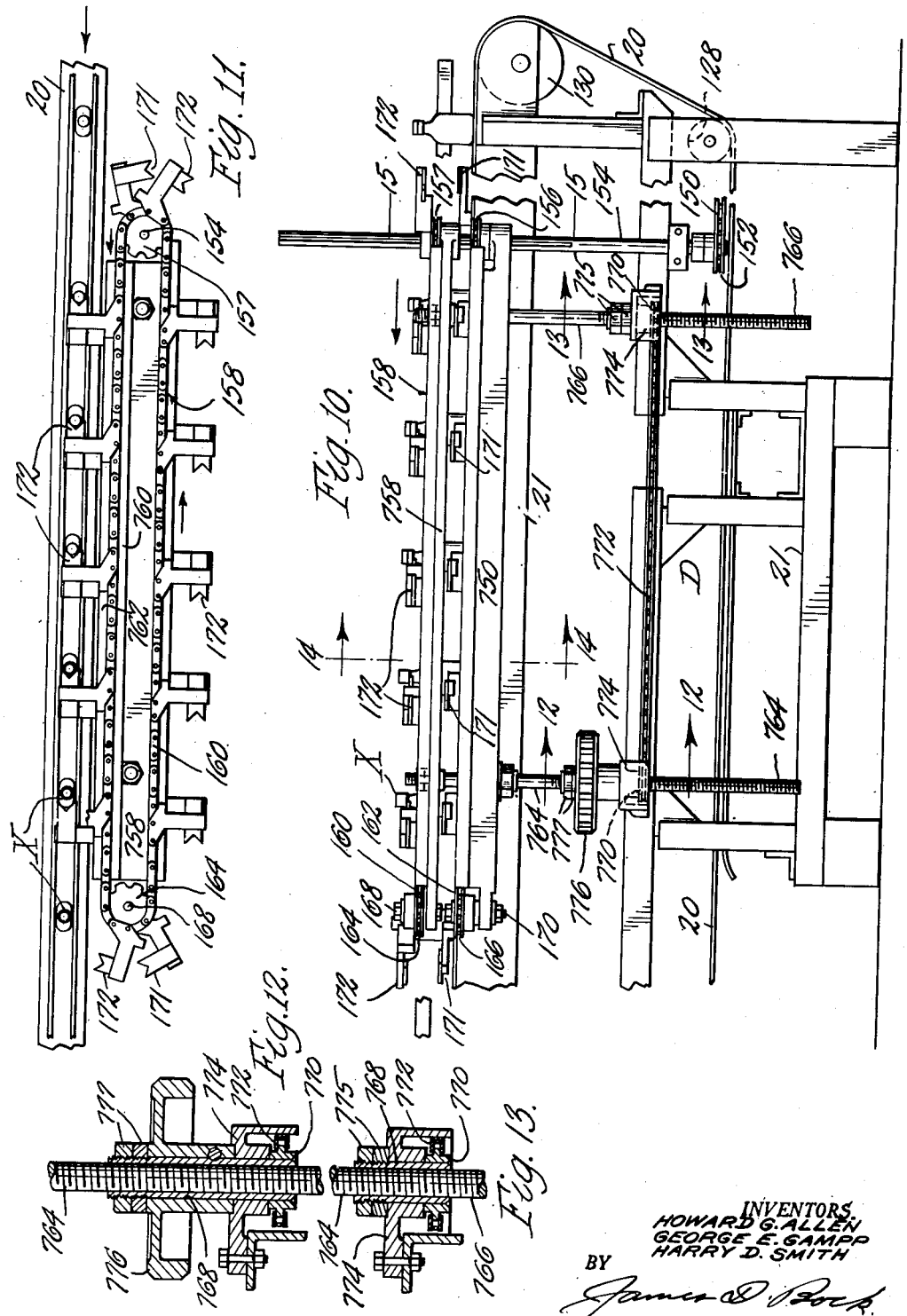
INVENTORS
HOWARD G. ALLEN
GEORGE E. GAMPP
HARRY D. SMITH
BY
James D. Bock
Attorney

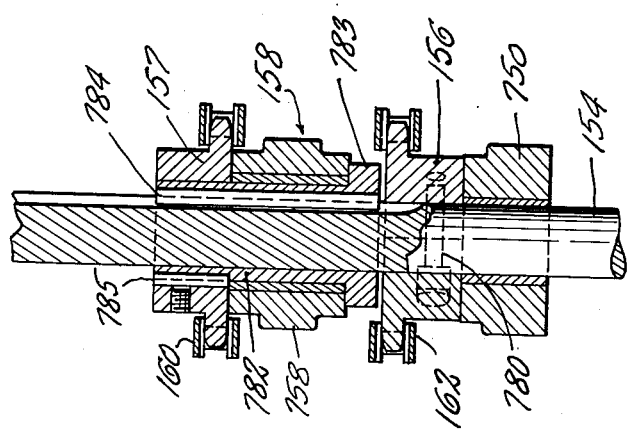
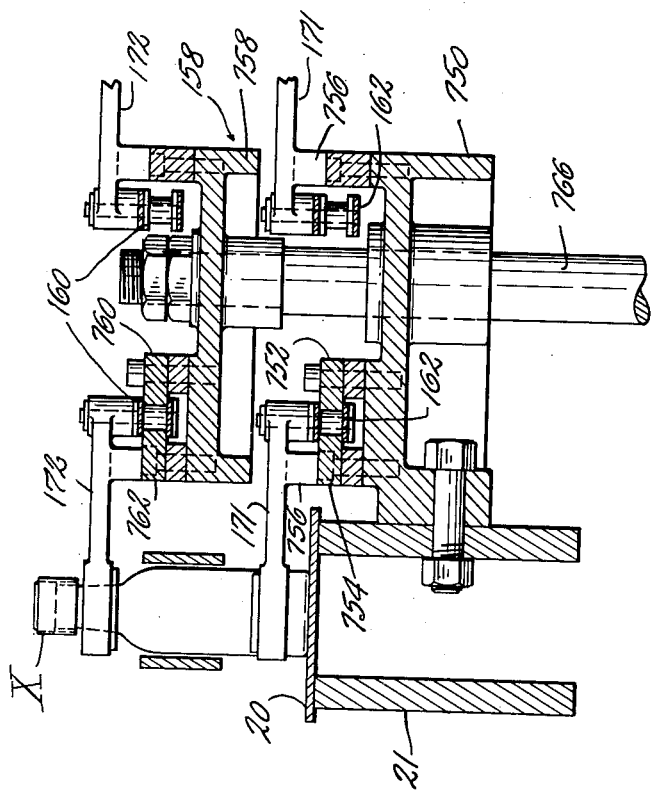

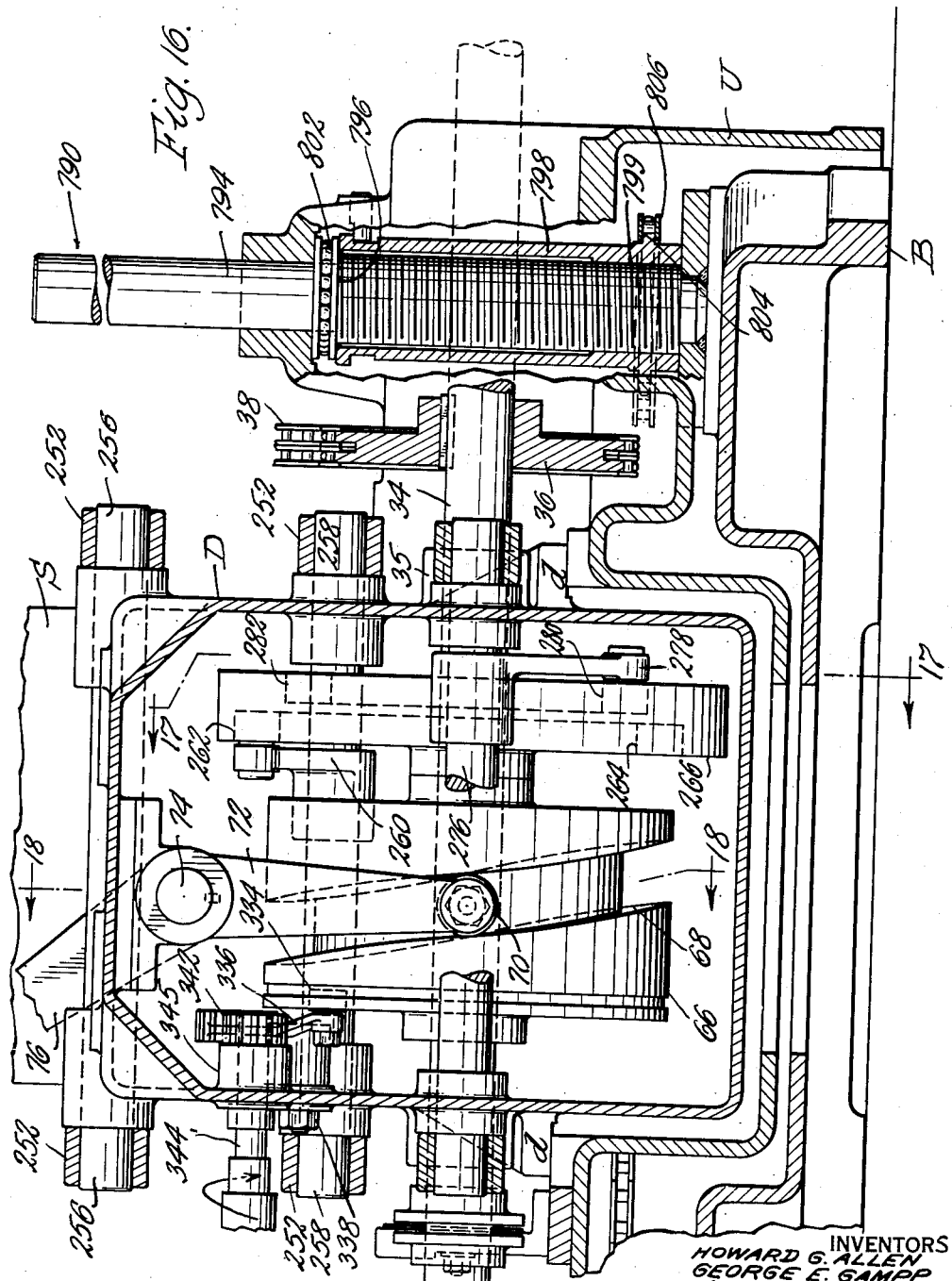

Oct. 6, 1953 H. G. ALLEN ET AL 2,654,520
BAND-APPLYING MACHINE
Filed March 31, 1947 24 Sheets-Sheet 8
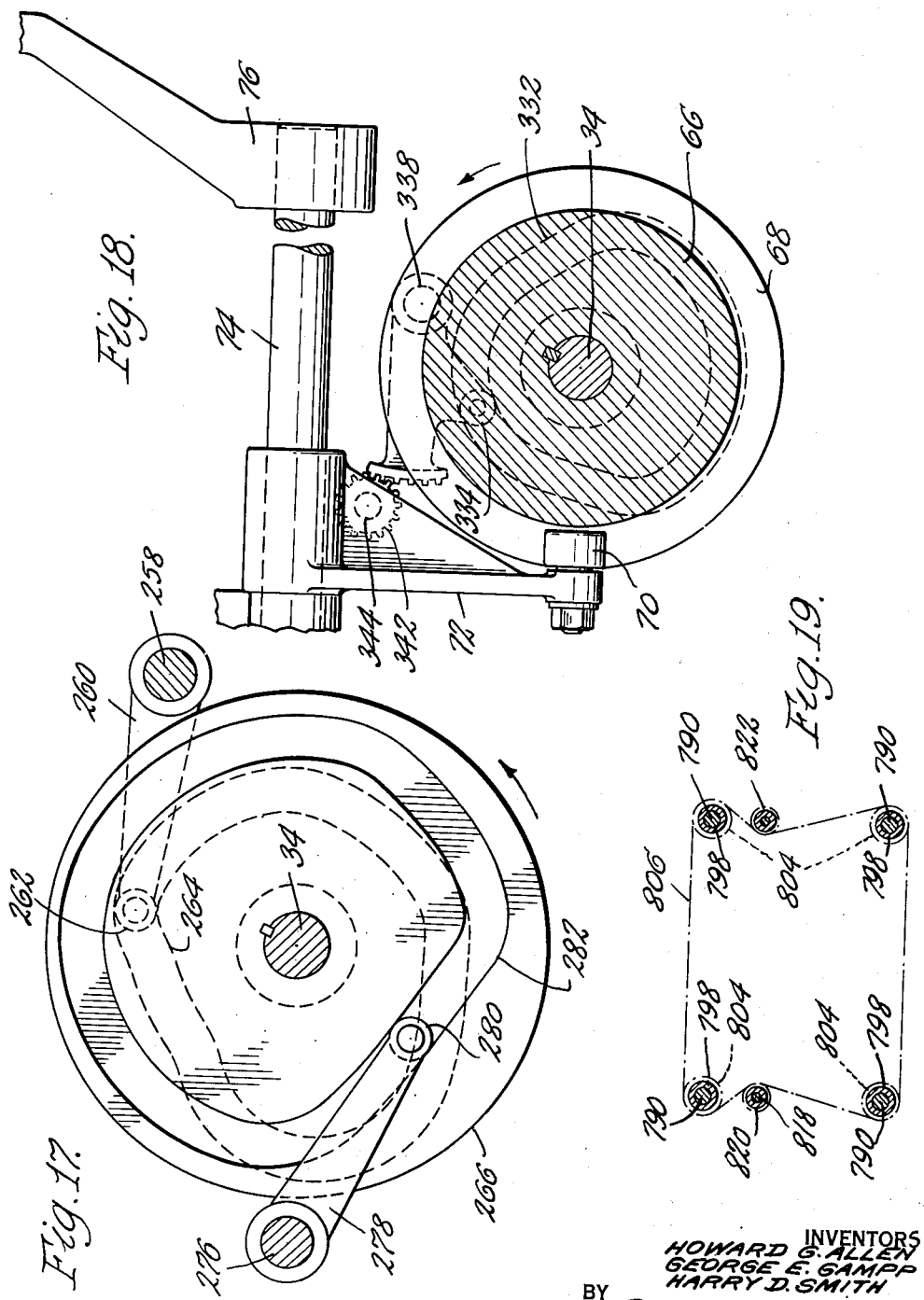
INVENTORS
HOWARD G. ALLEN
GEORGE E. GAMPP
HARRY D. SMITH
BY
James D. Bock
ATTORNEY

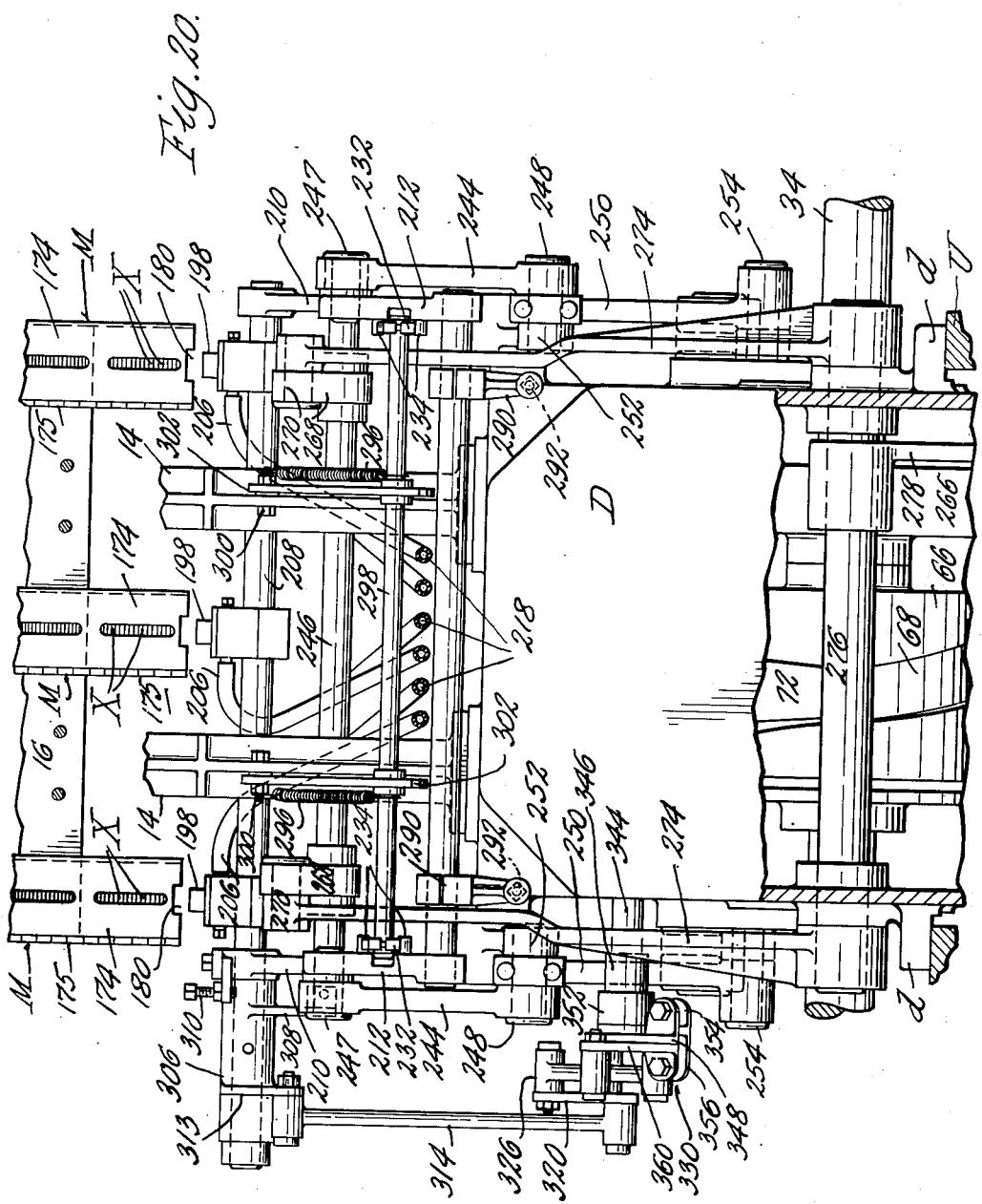

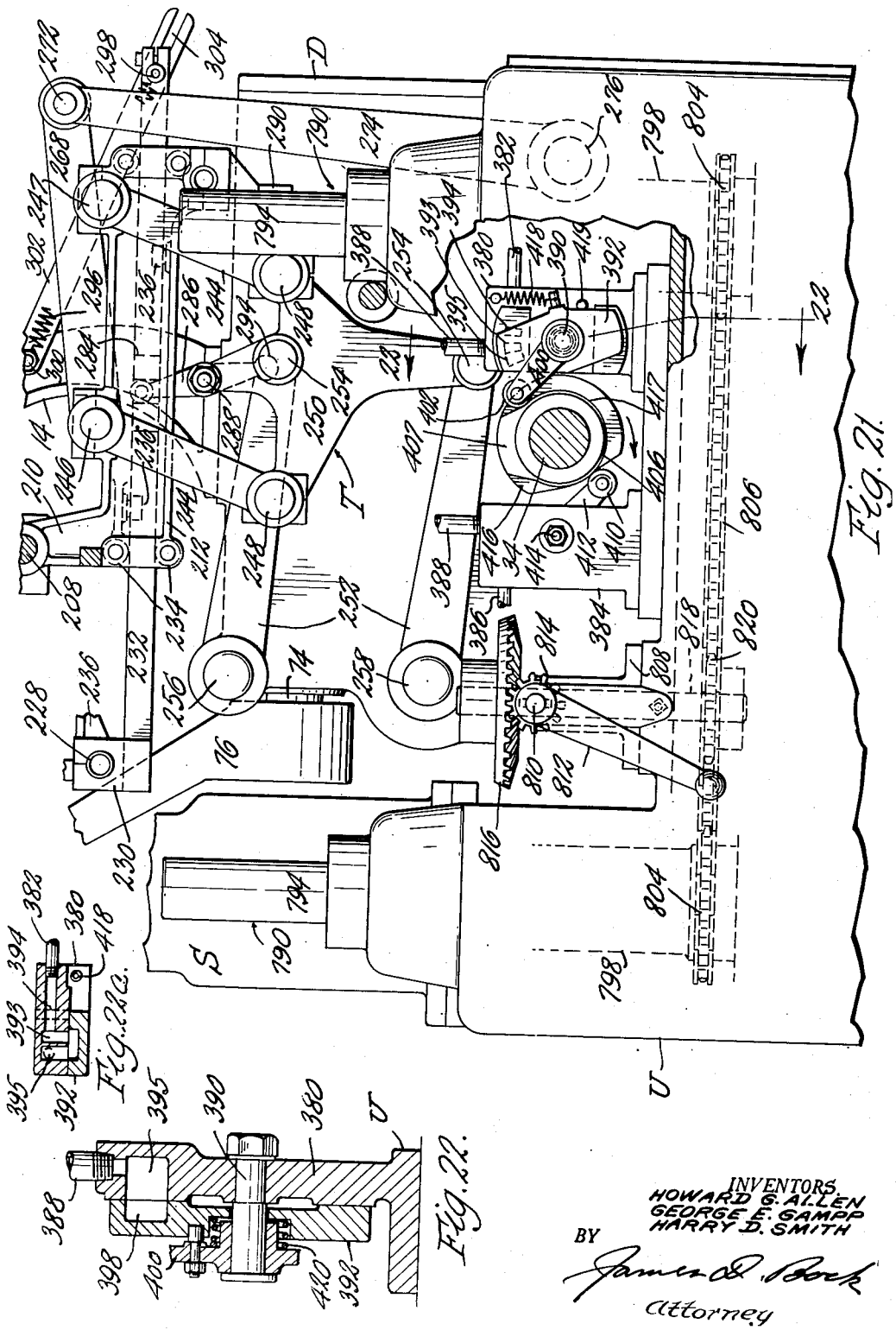

Oct. 6, 1953 H. G. ALLEN ET AL 2,654,520
BAND-APPLYING MACHINE
Filed March 31, 1947 24 Sheets-Sheet 11

INVENTORS.
HOWARD G. ALLEN
GEORGE E. GAMPP
HARRY D. SMITH
BY
James D. Bock
ATTORNEY

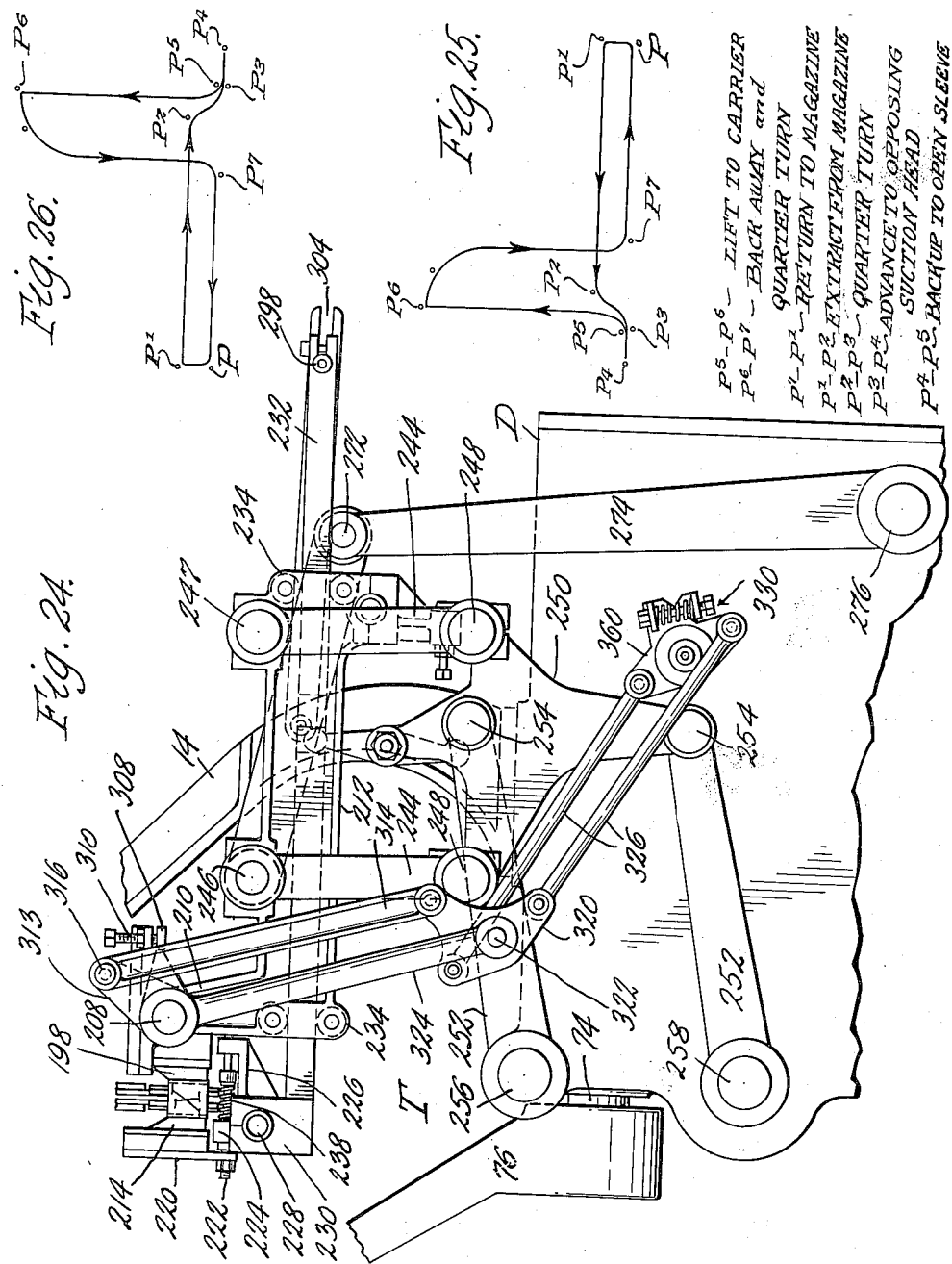

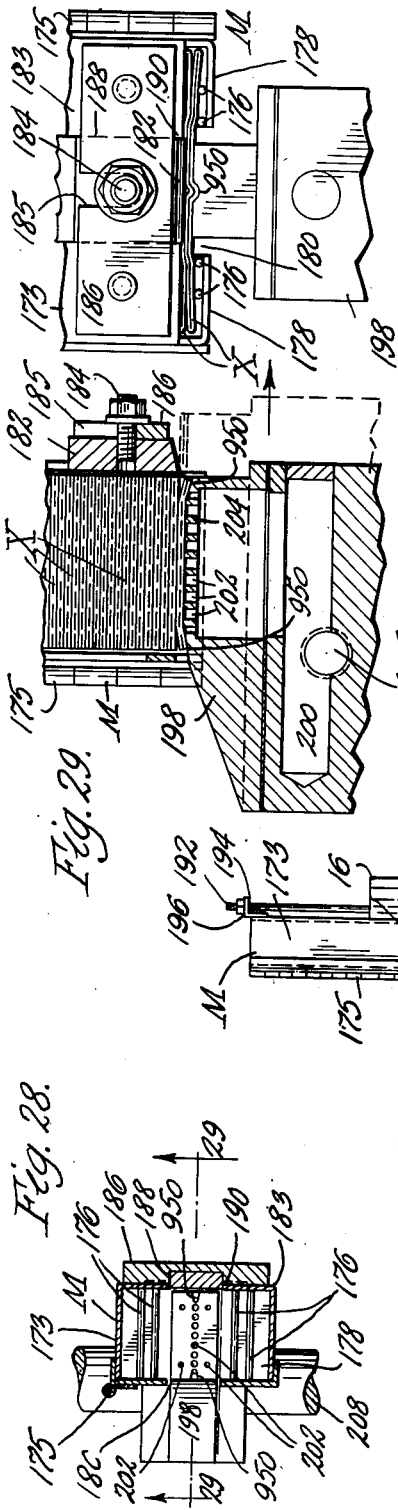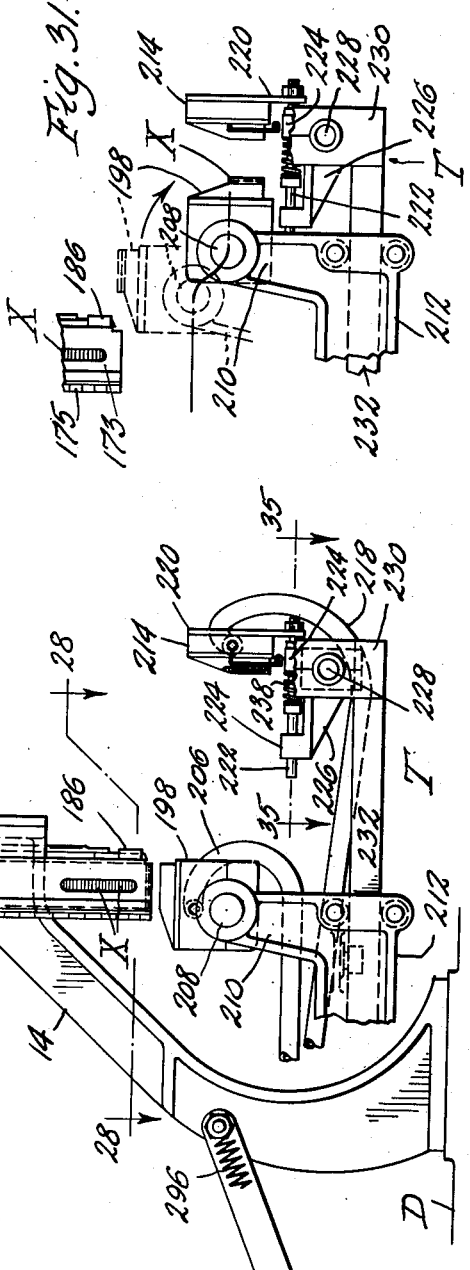

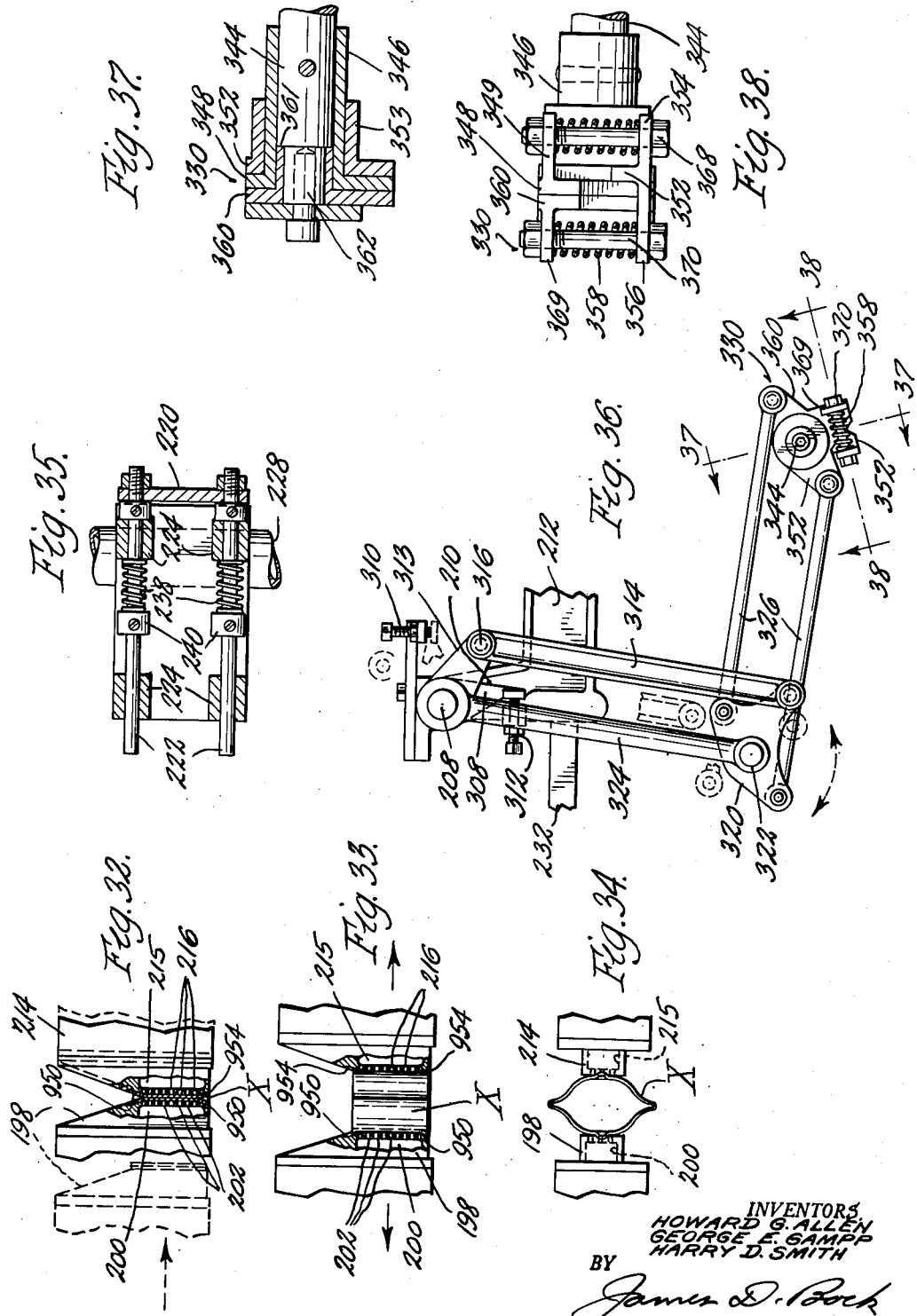

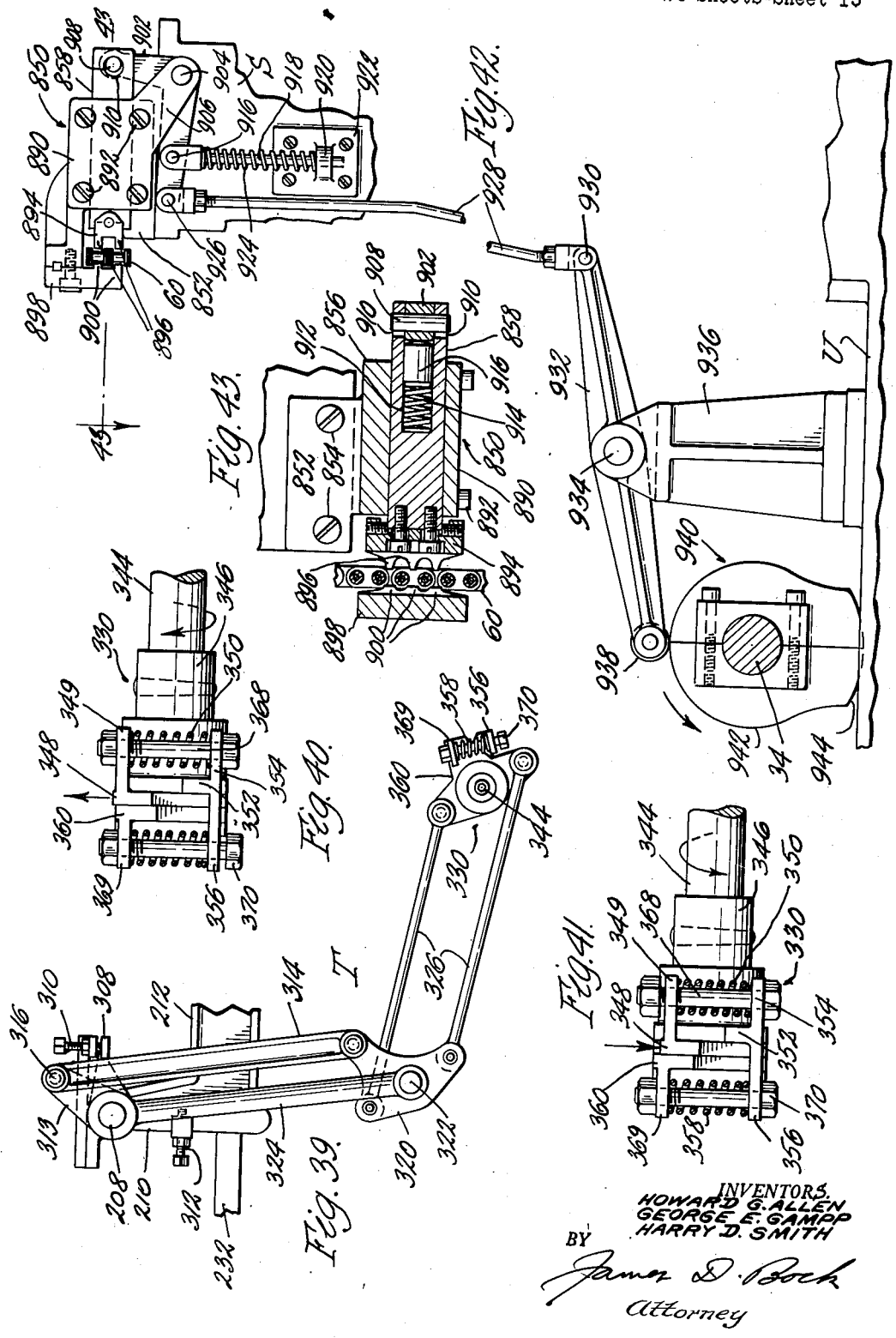

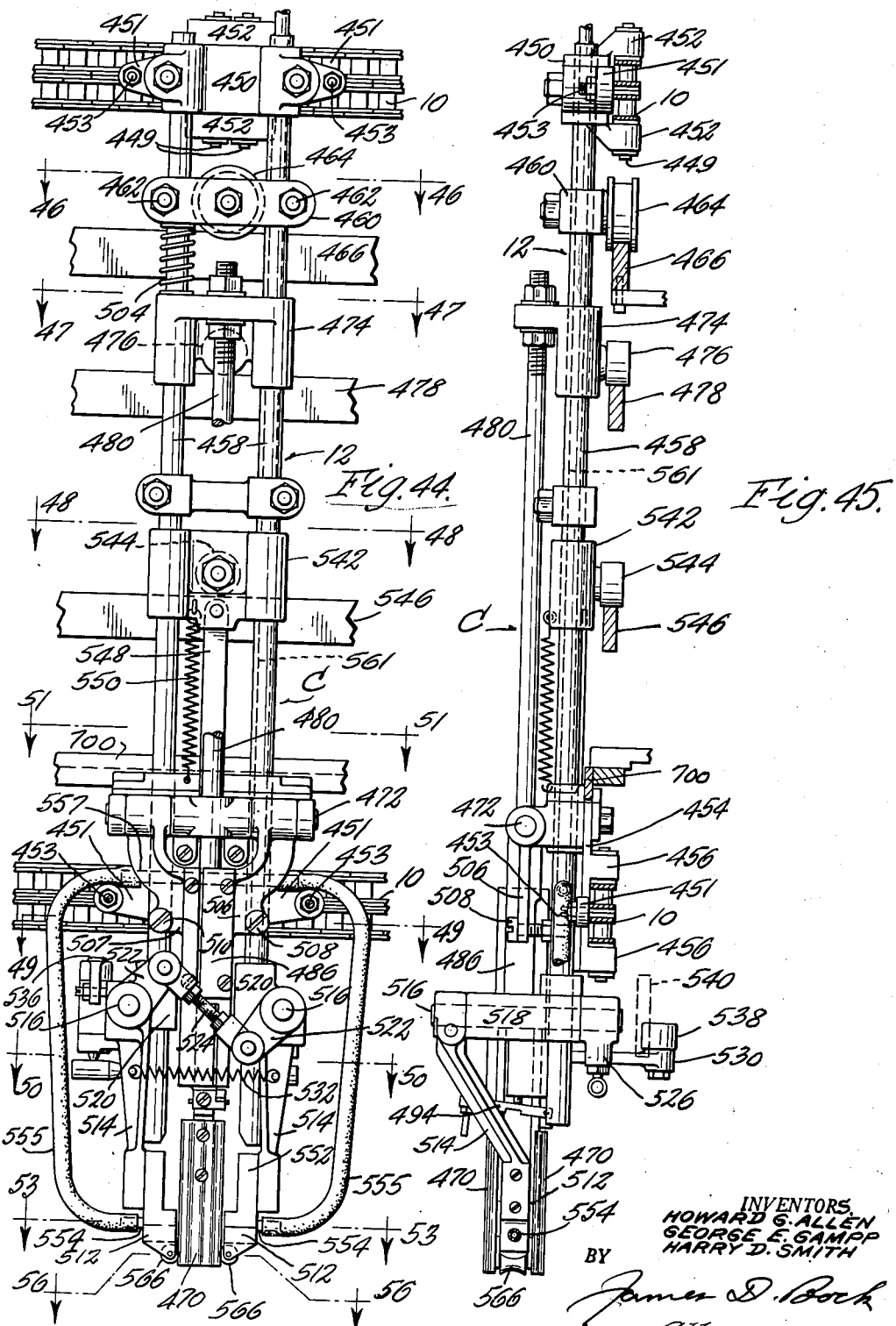

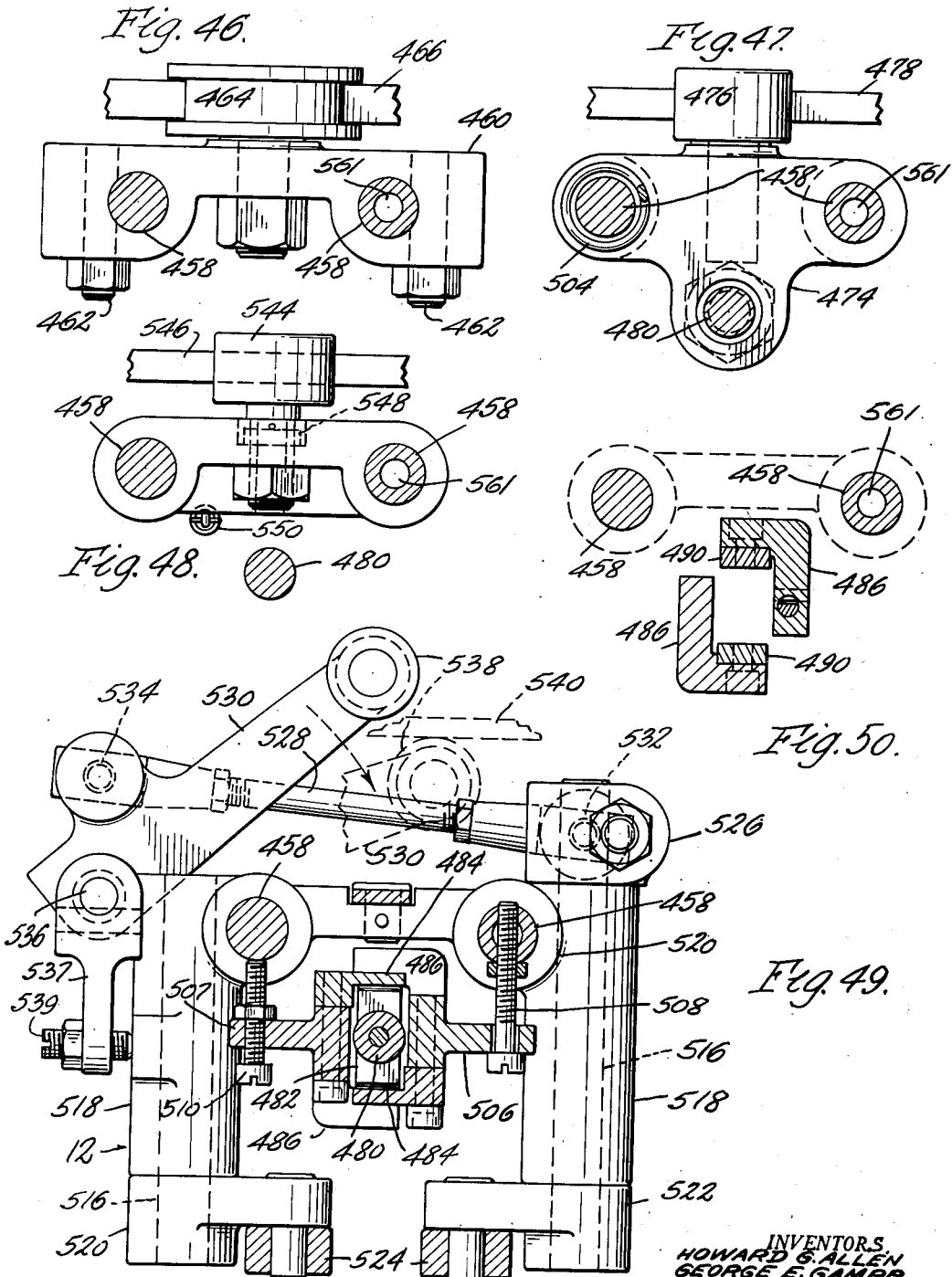

Oct. 6, 1953
H. G. ALLEN ET AL
2,654,520
BAND-APPLYING MACHINE
Filed March 31, 1947
24 Sheets-Sheet 18
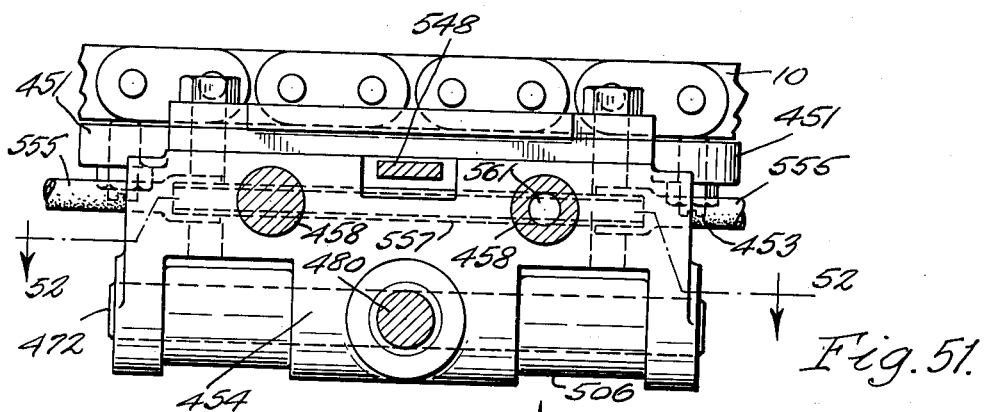
Fig. 51.
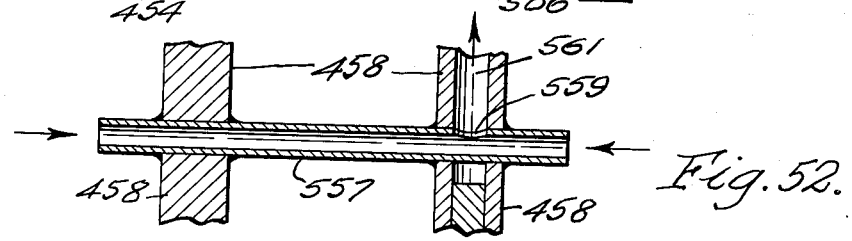
Fig. 52.
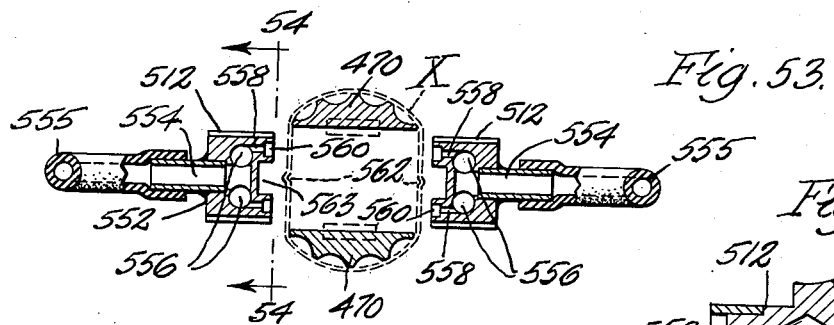
Fig. 53.
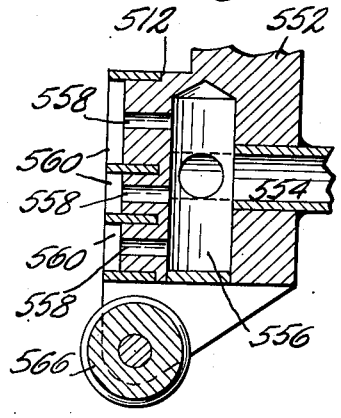
Fig. 55.
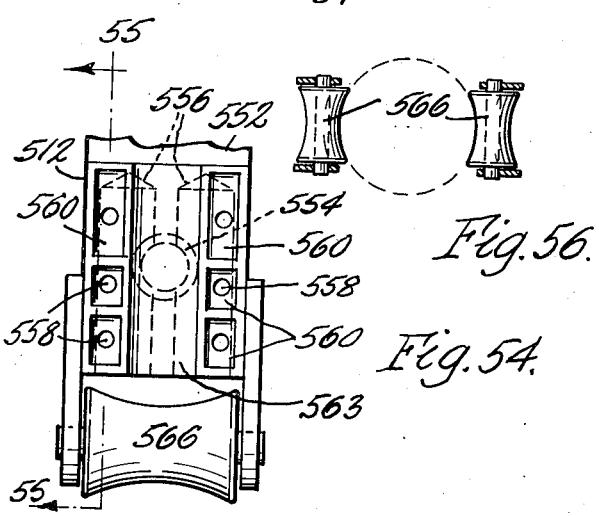
Fig. 56.
Fig. 54.
INVENTORS.
HOWARD G. ALLEN
GEORGE E. GAMPP
HARRY D. SMITH
BY James D. Boch
Attorney

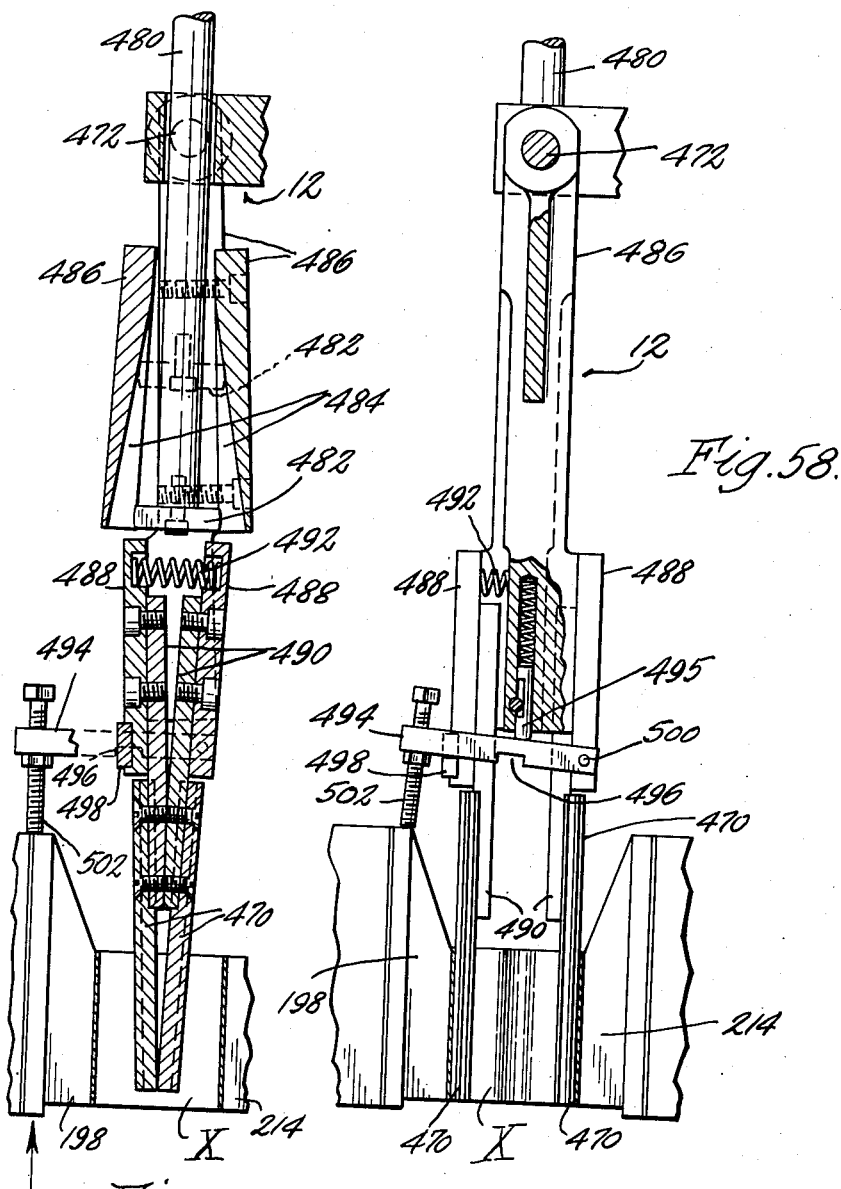

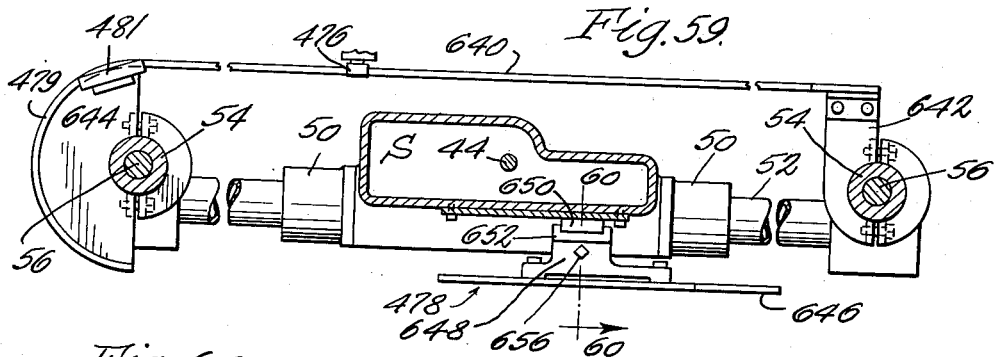
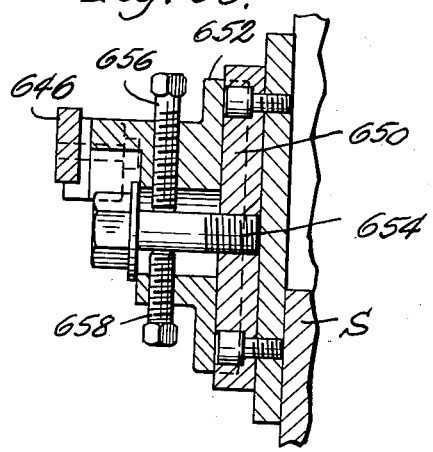
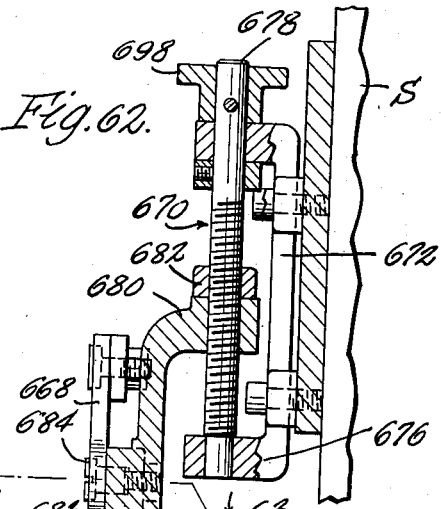
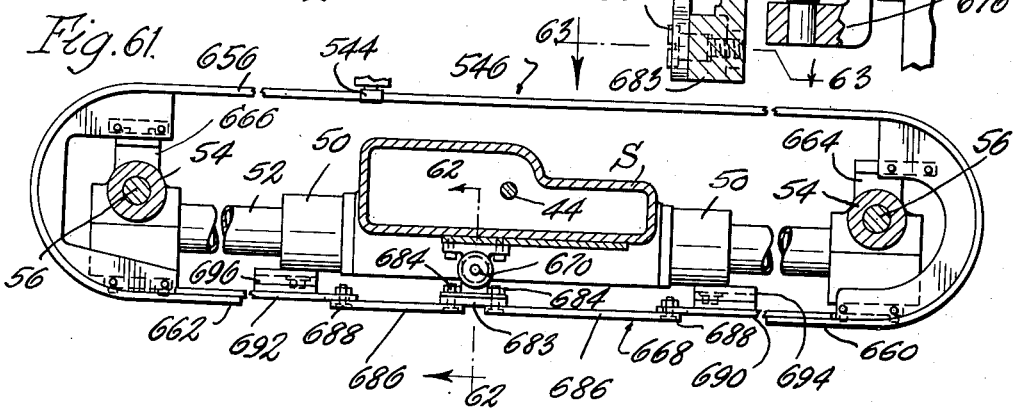
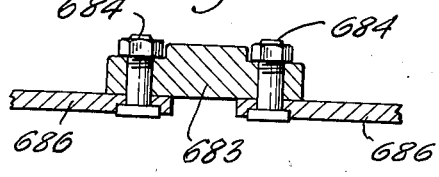

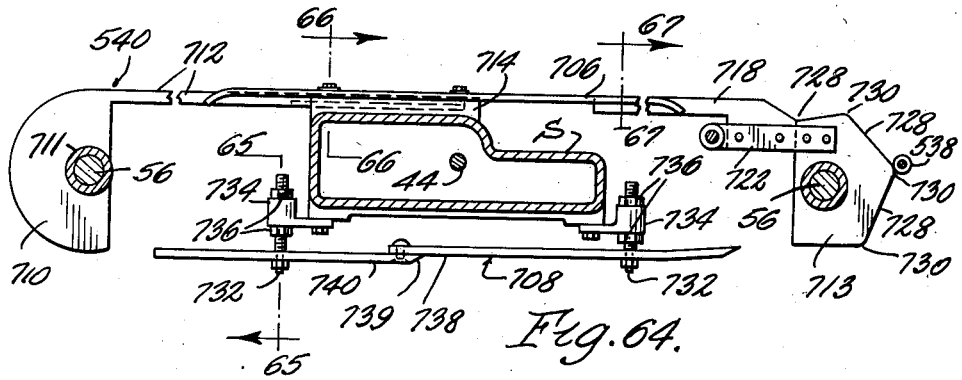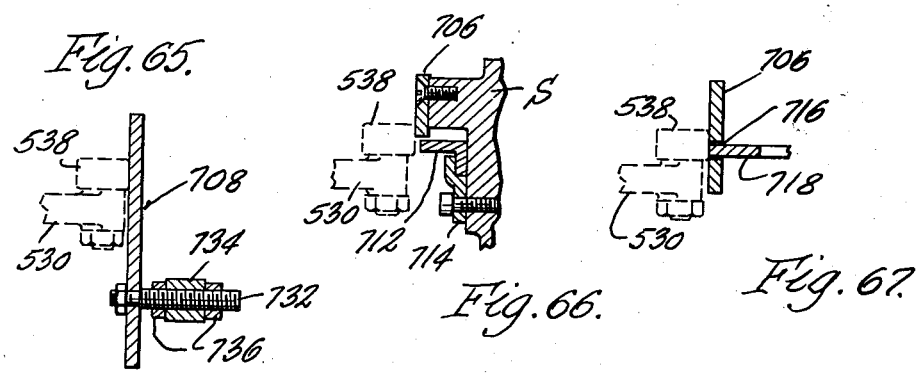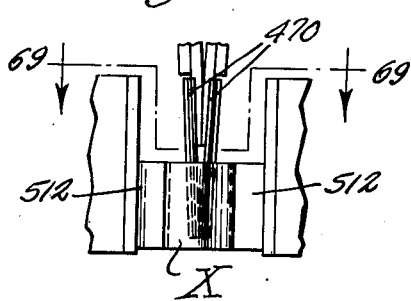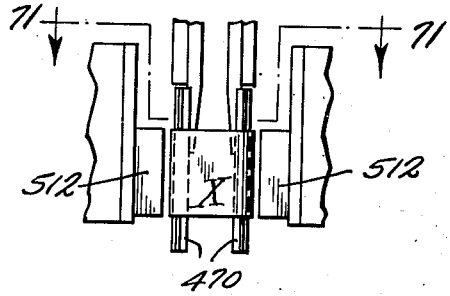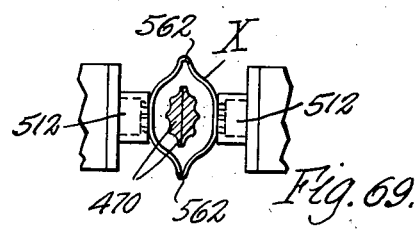

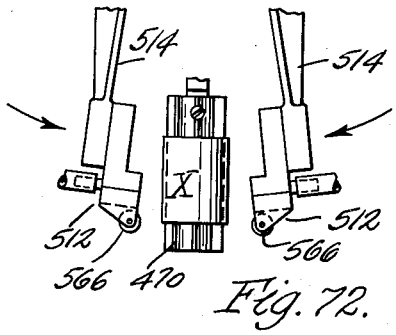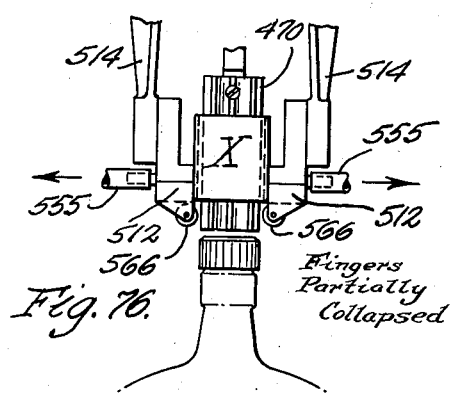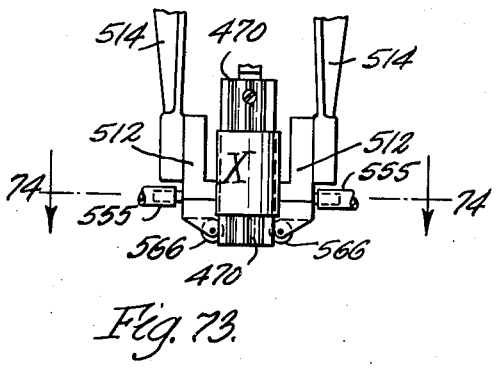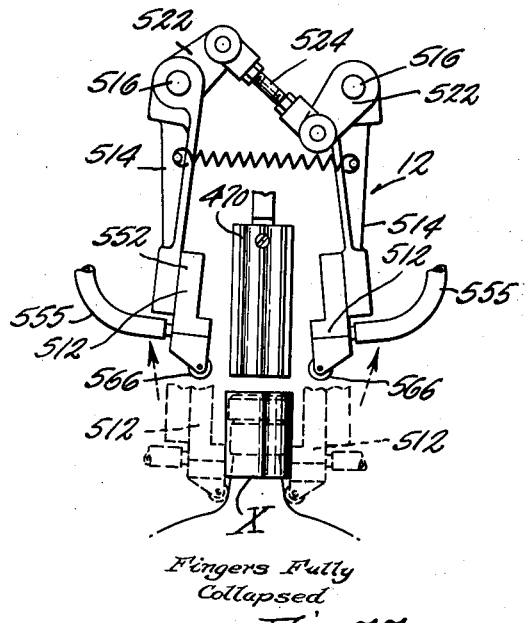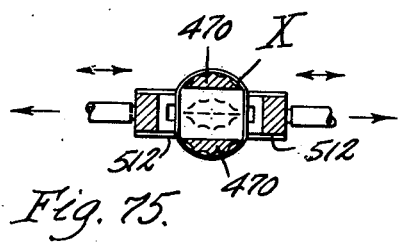

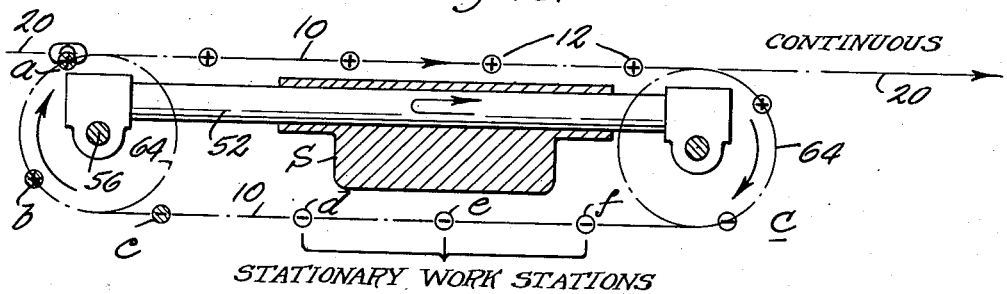
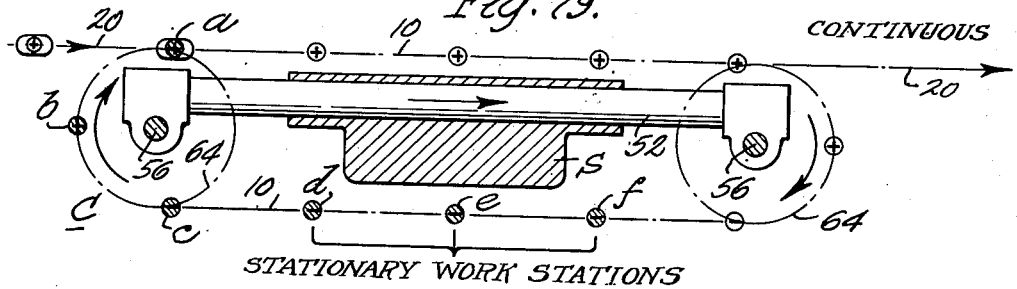
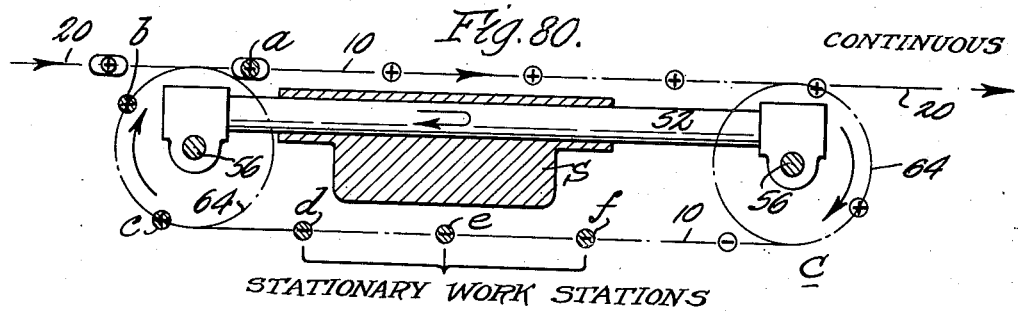
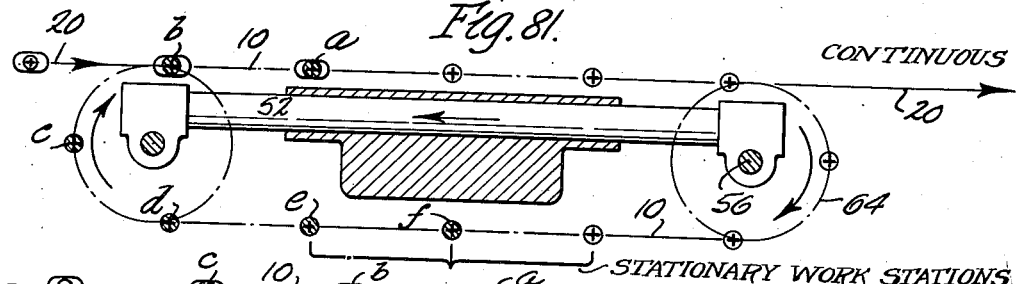

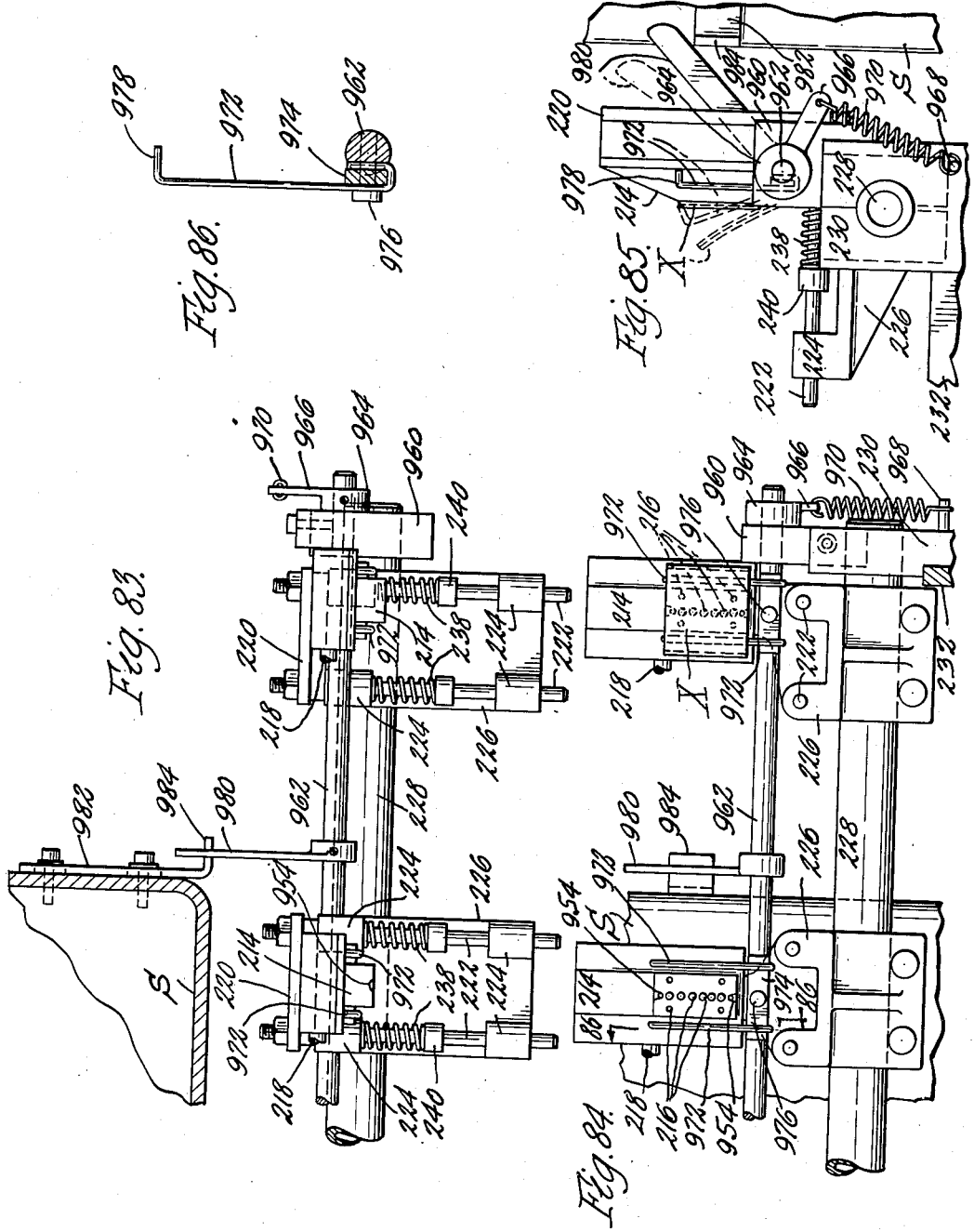

Patented Oct. 6, 1953

2,654,520

UNITED STATES PATENT OFFICE 2,654,520

BAND-APPLYING MACHINE

Howard G. Allen, Niagara Falls, George E. Gampp, Kenmore, and Harry D. Smith, Buffalo, N. Y., assignors to American Machine & Foundry Company, a corporation of New Jersey Application March 31, 1947, Serial No. 738,470

13 Claims. (Cl. 226—80)

The present invention relates to an automatic machine for the application of banding sleeves to bottles. An illustrative type of banding sleeve for which this machine is adapted is the shrinking, cellulosic sleeve widely used as a seal for bottles containing alcoholic beverages and the like. Such banding sleeves are ordinarily furnished to a bottling plant in a wet, expanded condition and they must be applied to the bottles in such condition. When the sleeves dry on the bottles, they shrink into tight engagement with the necks and frequently with some portion of the closures of the bottles. In the case of alcoholic beverages a tax stamp is usually attached to the neck of the bottle and is extended over the closure. In such case the banding sleeves are frequently applied after the tax stamp in order not only to seal the bottle, but also to protect the tax stamp against tampering. In such cases the banding sleeves must be transparent at least in the portions thereof which overlie the tax stamp. For decorative or advertising reasons the bottler may desire to have all other portions of the banding sleeve opaque. It is thus apparent that banding sleeves must be accurately positioned upon the necks of the bottles, in some cases to assure that they will have proper relationship with the bottle neck or with the neck and closure, if such be desired, and in other cases also to assure that transparent portions of the sleeve will be properly aligned with tax stamps. The present machine is particularly designed for accurate and rapid operation in the application of banding sleeves under any or all of the conditions discussed above.

The present invention comprises an improvement over the invention disclosed and claimed in application Serial Number 555,188, filed September 21, 1944, by Allen et al., now Patent No. 2,579,458, dated December 25, 1951.

The machine of the present invention is particularly well adapted for use in bottling plants and the like inasmuch as it provides for applying banding sleeves successively to bottles while the same are moving in a straight-line path of travel. The machine thus may be placed in existing production lines without major alterations therein.

The machine of the present invention has been designed for smooth and quiet operation with substantially no vibration and for these reasons may be positioned in proximity with any of the other apparatus customarily used in bottling or packaging plants.

It is an object of the present invention to provide a machine for rapidly and accurately positioning banding sleeves upon the bottles or other containers for which banding sleeves may be suitable.

It is a further object of the present invention to provide a machine in accordance with the preceding object which may be rapidly and accurately adjusted for operation upon containers of various sizes thus permitting its use in bottling or packaging plants in which the production line is so arranged as to deliver bottles or packages of various sizes in different periods of operation.

Other and further objects of the present invention will become apparent from a consideration of the following description of a preferred embodiment of the invention taken in connection with the drawings accompanying and forming a part of the present specification.

In the drawings:

Fig. 2 is a fragmentary front elevation of the machine with certain parts omitted and other parts shown in section;

Fig. 2a is a fragmentary detail view showing the driving connection between the machine and the bottle conveyor;

Fig. 3 is a fragmentary vertical section, on an enlarged scale, on line 3—3 of Fig. 2, illustrating the mounting of the upper carrier supporting rail;

Fig. 4 is a similar view on line 4—4 of Fig. 2, illustrating the lower rail for guiding the carriers;

Fig. 5 is a fragmentary horizontal section on line 5—5 of Fig. 2;

Fig. 6 is a vertical section on line 6—6 of Fig. 5;

Fig. 7 is a sectional plan view on line 7—7 of Fig. 6;

Fig. 8 is a fragmentary rear elevation of the machine with parts in section and certain parts omitted;

Fig. 9 is a fragmentary rear elevation of a portion of the bottle conveying and controlling means which extends beyond the righthand end of Fig. 8;

Fig. 10 is a fragmentary rear elevation of the machine generally similar to Fig. 8 but with different parts omitted;

Fig. 11 is a plan view of the parts shown in Fig. 10;

Fig. 12 is a fragmentary vertical section, on an enlarged scale, on line 12—12 of Fig. 10, showing the vertical adjusting means for the upper section of the bottle hold-back chain.

Fig. 13 is a similar view on line 13—13 of Fig. 10;

Fig. 14 is a fragmentary vertical section, on an enlarged scale, on line 14—14 of Fig. 10;

Fig. 15 is a similar view on line 15—15 of Fig. 10;

Fig. 16 is an enlarged fragmentary vertical section, illustrating the main drive shaft and the cam box and other parts associated therewith as viewed from the front;

Fig. 17 is a vertical section on line 17—17 of Fig. 16;

Fig. 18 is a similar view on line 18—18 of Fig. 16;

Fig. 19 is a diagrammatic plan view of the means for raising and lowering the main machine unit relatively to the base;

Fig. 20 is a fragmentary front elevation of a portion of the machine, with parts in section;

Fig. 21 is a fragmentary lefthand end elevation, partly in section, of the machine as viewed in Fig. 20;

Fig. 22 is a vertical section, on an enlarged scale, on line 22—22 of Fig. 21;

Fig. 22a is a detailed sectional view of a valve shown in Fig. 22;

Fig. 24 is a fragmentary lefthand end elevation of parts shown in Fig. 20;

Fig. 25 is a diagram with explanatory legend illustrating the movements of the parts shown in Fig. 24;

Fig. 26 is a similar diagram turned in the opposite direction for use in connection with views opposite to Fig. 24;

Fig. 27 is a fragmentary righthand end elevation of a portion of the machine illustrating in particular one of the sleeve magazines and a portion of the transfer mechanism;

Fig. 28 is a fragmentary horizontal section, on an enlarged scale, on line 28—28 of Fig. 27;

Fig. 29 is a fragmentary vertical section on line 29—29 of Fig. 28;

Fig. 30 is a fragmentary rear elevation of that portion of the magazine seen in Fig. 29;

Fig. 31 is a fragmentary elevation similiar to Fig. 27 but in which certain parts have been moved to a different position;

Figs. 32, 33 and 34 are fragmentary views illustrating the operation of a pair of suction heads in the transfer mechanism;

Fig. 35 is a horizontal section on line 35—35 of Fig. 27;

Fig. 36 is a lefthand end elevation of certain parts of the transfer mechanism;

Fig. 37 is a vertical section on line 37—37 of Fig. 36;

Fig. 38 is a face view of certain parts taken in the direction of the arrows on line 38—38 of Fig. 36;

Fig. 39 is a view similar to Fig. 36 illustrating another position of the parts;

Figs. 40 and 41 are views smiliar to Fig. 38, illustrating other positions of the parts therein;

Fig. 42 is an elevation, partly broken away, ilustrating a mechanism for intermittently locking a portion of the carriage drive chain;

Fig. 43 is a horizontal section, on an enlarged scale, on line 43—43 of Fig. 42;

Figs. 44 and 45 are, respectively, front and side elevations of one of the carriers;

Figs. 46 to 51, inclusive, are horizontal sectional views taken respectively on lines 46—46 to 51—51 of Fig. 44;

Fig. 52 is a fragmentary vertical section on line 52—52 of Fig. 51;

Fig. 53 is a horizontal section on line 53—53 of Fig. 44;

Fig. 54 is an enlarged face view of one of a pair of suction pads on each carrier taken on line 54—54 of Fig. 53;

Fig. 55 is a vertical section taken on line 55—55 of Fig. 54;

Fig. 56 is a horizontal section on line 56—56 of Fig. 44;

Fig. 57 is a fragmentary sectional view of a lower portion of one of the carriers, showing the sleeve carrying fingers thereof in closed position;

Fig. 58 is a side elevation, partly in section, showing the parts in another position;

Fig. 59 is a horizontal section partly broken away, taken on line 59—59 of Fig. 8, illustrating the cam track for controlling the carrier fingers;

Fig. 60 is a transverse vertical section thereof on line 60—60 of Fig. 59;

Fig. 61 is a horizontal section partly broken away on line 61—61 of Fig. 8, illustrating the cam track for controlling the suction pads in the transfer of sleeves from the carriers to the bottles;

Fig. 62 is a vertical section, on an enlarged scale, on line 62—62 of Fig. 61;

Fig. 63 is a fragmentary horizontal section on line 63—63 of Fig. 62;

Fig. 64 is a view similar to Figs. 59 and 61, illustrating the cam track for controlling the carrier fingers;

Figs. 65, 66 and 67 are enlarged fragmentary vertical sections taken respectively on lines 65—65, 66—66 and 67—67 of Fig. 64;

Fig. 68 is a fragmentary view showing one position of parts during transfer of an opened sleeve to the receiving fingers of one of the carriers;

Fig. 69 is a horizontal section on line 69—69 of Fig. 68;

Fig. 70 is a view similar to Fig. 68 showing the parts in different relative positions;

Fig. 71 is a horizontal section on line 71—71 of Fig. 70;

Fig. 72 is a fragmentary face view of a portion of a carrier showing a sleeve mounted on the fingers thereof and the carrier suction pads in spaced relation thereto;

Fig. 73 is a similar view showing the pads in a lower position and in engagement with the sleeve;

Fig. 74 is a horizontal section on line 74—74 of Fig. 73;

Fig. 75 is a view similar to Fig. 74 showing a further step in the operation of these parts;

Fig. 76 is a view illustrating the position of certain parts at the time a sleeve is about to be lowered over the neck of a bottle;

Fig. 77 is a similar view wherein the sleeve has been applied to the bottle and the parts applying it thereto have been moved out of engagement therewith;

Figs. 78 to 82 are diagrammatic views illustrating a cycle of operation of the carrier conveyor;

Figs. 83, 84 and 85 are fragmentary plan, elevational and end views, respectively, of mechanism for clearing accidentally unopened sleeves from the suction heads, and Fig. 86 is a detailed sectional view taken along the line 86—86 in Fig. 84.

General description

Figure 1:
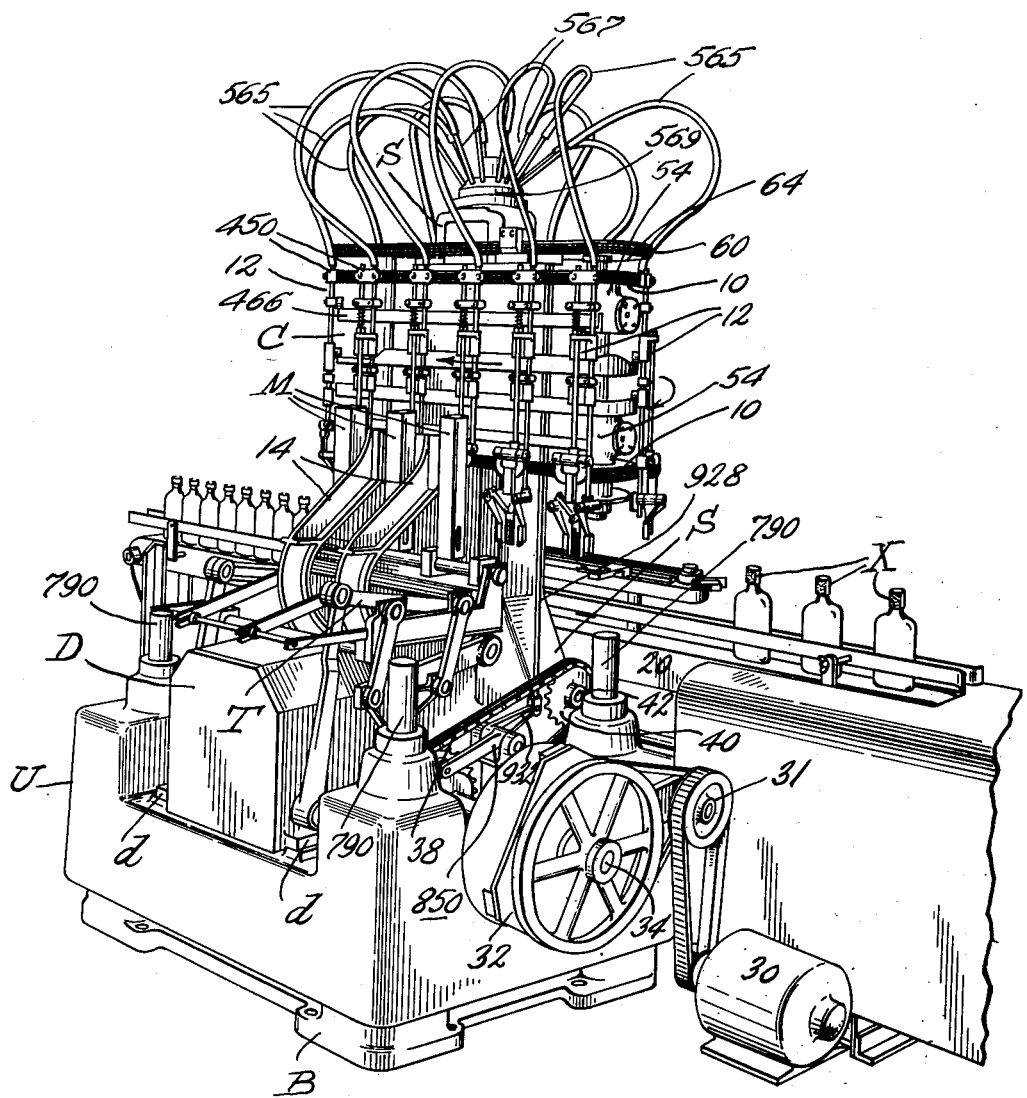
Fig. 1 is a fragmentary perspective view of the front of the machine, illustrating the driving connections therefor.

In the embodiment illustrated generally in Fig. 1 the machine includes a stationary base B resting on the floor. Considering the front of the machine as being that part facing the observer in Fig. 1, there is mounted upon the base B a unit or supporting member U, from the rear of which, and integral therewith, projects an upright main standard S. In front of standard S there is a hollow cam box D, having laterally extending brackets d by which it is secured to the unit U.

The unit U including the cam box D and standard S, is adjustably supported upon base B for up and down movements relatively to base B for the purpose of adjustably positioning various operating mechanisms carried by the parts U, D and S for placing sleeves or bands X upon the necks of bottles or containers of various heights, or alternatively, for placing such sleeves in one or another selected elevation on or relative to the bottle necks. This elevating mechanism is shown most clearly in Figs. 16, 19 and 21.

The main upright standard S operatively supports a carriage C arranged to reciprocate in a horizontal path parallel with the front of the machine. The carriage C has mounted on it a pair of horizontal, vertically spaced endless carrier chains 10 which support a series of equally spaced sleeve carriers 12, shown in detail in Figs. 44 and 45.

Stationarily supported by a pair of upwardly and rearwardly extending brackets 14, fixed to the top of the cam box D is a horizontal bar 16 to which is secured a group (three in this instance) of magazines M comprising upright housings shown in detail in Figs. 27 and 30. Each magazine M contains a stack of collapsed sleeves X arranged horizontally one upon the other. Also mounted on the cam box D is a transfer mechanism T operable to simultaneously remove sleeves X one at a time from each magazine M, open the sleeves, and place the sleeves in a position in which they may simultaneously be transferred to three of the sleeve carriers 12 which are at that moment positioned to receive them.

The sleeve carriers 12 travel about the carriage C in the direction of the arrows in Fig. 1. In a zone at the front of the machine, they are stopped intermittently in groups of three so that each carrier in a group comes to rest in operative relation and alignment with one of the three magazines and with the transfer elements of the transfer mechanism T. Thus a time interval is provided wherein the sleeves removed from the magazines, as explained, may be transferred to the three carriers in the group thus aligned after which the three carriers are moved in one step or increment a distance equal to three times the distance between adjacent carriers. The carrier actuating means will thus bring the next succeeding group of three carriers into the position formerly occupied by the first group mentioned. A second group of three sleeves is then transferred to the second group of carriers during the time such group remains stationary and in alignment with the transfer mechanism. The operation continues in this manner at the front of the machine and is diagrammatically illustrated in Figs. 78-82.

The intermittent motion of the carriers 12 just described is achieved by properly-timed reciprocation of the carriage C which is so constructed and arranged that the carriers 12, after passing around the left end of the carriage C to the rear thereof will travel continuously at a uniform rate of speed from one end to the other at the rear side thereof. During a selected portion of the travel of the carriers 12 along the rear of the carriage, the sleeves carried thereby are removed from the carriers and are applied one after another to a series of continuously moving spaced bottles beneath the carriers in axial registration therewith.

A conveyor 20 and associated mechanism is provided to receive bottles from a suitable source, space them at proper intervals and conduct them along the rear side of the machine in vertical alignment respectively with the carriers 12.

Driving mechanism

To drive the various operating units of the machine, a suitable source of power such as an electric motor 30 may be used (see Fig. 1). This motor is operatively connected to a speed change device 31 and a reduction gearing 32 by means of a belt and pulleys of suitable size. The reduction gearing unit 32 is mounted on one end of a horizontal main drive shaft 34, journalled in suitable bearings 35 in the cam box D (see Fig. 16). On the shaft 34 is secured a sprocket 36 connected by sprocket chain 38 to a smaller sprocket 40 mounted on one end of second horizontal shaft 42 suitably journalled in the lower portion of the standard S.

As shown in Fig. 2, a vertical drive shaft 44 is journalled in the standard S and is operatively connected to the shaft 42 through bevel gears 46. The shaft 44 projects from the top of the standard and is there provided with a drive sprocket 48 (see Fig. 6). The upper portion of standard S is provided with vertically spaced bearings 50 in which are slidably mounted two vertically spaced horizontal rods 52, the free outer ends of which are secured by tie members 54. Rods 52 and members 54 constitute the carriage C (see Figs. 59 and 62). Each tie member 54 rotatably supports a vertical shaft 56, each having fixed to its upper end a sprocket wheel 58. Sprocket wheels 58 are in the horizontal plane of the sprocket wheel 48. An endless drive chain 60 passes around the sprockets 58, the drive sprocket 48, and around idler sprockets 62 (see Fig. 5), the latter being journalled on stub shafts which bear in the upper face of standard S. One of the idler sprockets 62 is adjustably mounted on the standard S as by a slot 61 and screw 63 to take up slack in the chain 60. The chain 60 is so threaded around the various sprockets just described as to have a straight run across the front of the machine between the sprockets 58 and to have a rear run which is parallel to the front run except for an offset portion extending around the idlers 62 and the drive sprocket 48. Rotation of the drive sprocket 48 is transmitted to the sprockets 58 irrespective of movement of the carriage C.

The shafts 56, which carry sprockets 58, also carry pairs of spaced sprockets 64, all of the same size, about which the carrier chains 10 are conducted in a manner to form straight parallel runs at the front and rear of the carriage C for the carriers 12.

Referring now to Fig. 16 there is shown driving means for reciprocating the carriage C. The main shaft 34 has secured thereto, in cam box D, a drum cam 66 having a cam track 68 for the reception of a roller follower 70 secured to the free lower end of a lever 72, fixed to the front end of a horizontal rock shaft 74 journalled in the cam box. The rear end of this shaft 74 has fixed to it an upstanding lever 76 pivoted at its upper end at 78 (see Fig. 2) to one end of a link 80. The other end of link 80 is pivoted at 82 to the left-hand tie member 54 of the carriage C.

The shaft 42 extends beyond standard S to the left as shown in Fig. 2 and a sprocket 84 mounted thereon drives a chain 86. As shown in Fig. 2a, the chain 86 drives a sprocket 88 mounted on a shaft 90 to which is fixed a sprocket 92. A chain 94 connects sprocket 92 with a sprocket 96 on a shaft 98 positioned in the rear of shaft 42 as viewed in Fig. 2. The shaft 98 is shown in Fig. 8. The chain 86 and the sprockets 84 and 88 are housed in a chain guard 100. Another chain guard 102 houses the sprocket 92, chain 94 and sprocket 96, the shaft 90 forming a pivotal connection for the housings 100 and 102. This forms a knee-action driving connection from the shaft 42 to the shaft 98 permitting vertical movement of the shaft 42 with respect to shaft 98, the purpose of which will be explained.

As shown in Fig. 8, the sprocket 96 is secured to the shaft 98 intermediate the ends thereof. The shaft 98 is suitably journalled in a conveyor frame 104 which supports the belt or conveyor 20. The left-hand portion of shaft 98, as seen in Fig. 8, carries a bevel gear 108 which drives a bevel gear 110 mounted on a cross shaft 112 journalled on the conveyor frame 104. Shaft 112 carries a sprocket 114 which drives, through a chain 116 a sprocket 122 fixed to a shaft 118 carrying a conveyor pulley 120. The conveyor belt 20 passes over the drive puley 120, thence to idlers 126 (Fig. 8) and 128 (Fig. 10), and a pulley 130, at the same elevation as pulley 120. The horizontal run of the belt 20 between pulleys 120 and 130 serves to carry bottles through the machine.

The conveyor belt 20 is preferably of the type which is made up by articulating a series of metal plates whereby the horizontal botte carrying run presents a substantialy smooth metal surface. The conveyor driving mechanism drives the belt 20 at a linear speed somewhat greater than the linear speed of the carriers 12 and means will now be described for spacing the bottles and holding them to a linear speed equal to that of the carriers 12.

The shaft 98 carries a bevel gear 132 (see Fig. 9) for driving a vertical shaft 134 through a bevel gear 136. Shaft 134 is suitably journalled in the frame 104 and has fixed thereto a sprocket 138. A chain 140 engages this sprocket and also a sprocket 142 mounted on the lower end of a vertical shaft 144 in frame 104. Shaft 144 extends upwardly into a suitable star wheel mechanism indicated generally at 146, including a star wheel 145. The star wheel mechanism 146 includes suitable gearing for driving the horizontally disposed star wheel 145 at such a speed as to release bottles at equally spaced intervals for travel along the belt 20. This timed release, together with hold-back mechanism to be described, assures proper registry of bottles with the carriers 12.

Also mounted on vertical shaft 134 is a sprocket 148 driving a chain 150. This chain drives a sprocket 152 on a vertical shaft 154 (see Figs. 8-10) which carries sprockets 156 and 157 at the right-hand end of a hold-back conveyor 158 arranged to run at the same speed as that of the carriers 12. The conveyor 158 consists of a horizontal run of two endless chains 160 and 162 which at their left-hand ends respectively engage sprockets 164 and 166 mounted on adjustable take-up shafts 168 and 170.

The chains 162 and 160 of the hold-back conveyor 158 have mounted thereon hold-back fingers 171 and 172, respectively. The fingers 171 and 172 are so positioned along the chains 162 and 160 as to engage respectively the body and the neck portion of each bottle, steadying the bottles to prevent chatter and to maintain registry of the bottles with the carriers 12. As shown in the drawings, the fingers 171 and 172 may be suitably shaped as by having V-shaped notches therein to securely engage bottles of the particular shape desired. Since the conveyor belt 20 is constantly traveling at a higher speed than the carriers 12, it slips on the bottoms of the bottles, thus urging the bottles constantly into engagement with the members 171 and 172.

*Sleeve magazines*

The three sleeve magazines M carried by the bar 16 are alike. As shown in Figs. 28 and 29, each magazine M includes an upright channel 173 of U section the web 183 of which is attached to bar 16 and the flanges of which form the spaced side walls of the magazine. To the free edge of one of these side walls a door or plate 174 is hinged as at 175. The door 174, when opened, affords access to the magazine for filling and replenishing sleeves and, when closed, retains the sleeves in place.

The sleeves X are supported flatwise one on another with the lowermost sleeve resting on spaced parallel rods 176 (see Figs. 28 and 30) lying upon the inturned lower ends 178 of the side walls. An opening 180 is provided between the inner rods 176 into which a suction head may enter to remove the sleeves. Since the rods 176 are of small cross section, a minimum frictional resistance is offered against the free removal of sleeves.

The sleeves X are removed, one at a time, from the magazines M by sliding the lowermost sleeve to the right as viewed in Fig. 29 out of an opening at the bottom of each magazine. Since the sleeves used at different times may be of different thicknesses, it is desirable to provide means for adjusting the discharge opening to insure that only one sleeve may be removed at each operation.

In the present instance (see Fig. 30), the wall 183 opposite the door 174 of each magazine terminates a distance above the rods 176 and has formed therein a central vertical opening 190. A guide plate 186 is fixed to the wall 183 and has formed therein a vertical recess or guideway 188. A gage 182 is mounted in the guideway 188 to slide up or down for adjustment of the lower edge of the gage 182 to allow one sleeve to clear the gage, and to prevent simultaneous removal of more than one sleeve.

The gage 182 may be vertically adjusted by means of a rod 192 (Fig. 27) secured at its lower end to the gage 182 and threaded at its upper end. The rod 192 passes through a clearance opening in a lug 194 at the upper end of the magazine. An adjusting nut 196 is threaded on the rod 192 and may be adjusted against the lug 194 to raise and lower the gage 182. A clamping nut and bolt 184 may be extended through a slot 185 in the plate 186 and tightened to clamp the gage after the foregoing adjustment has been made.

*Transfer mechanism*

The transfer mechanism includes means for removing the sleeves X from the magazines M and means for opening and positioning the sleeves on the carriers 12. As shown in Fig. 20 a suction head 198 is provided for each magazine M for the purpose of removing the sleeves from the magazines. As shown in Fig. 29 each head 198 includes a suction chamber 200 communicating with a plurality of ports 202 in a flat face or wall 204. The chamber 200 communicates with a port 205 in the side of the head to which a flexible hose 206 is attached (see Fig.

27). Each of the heads 198 is arranged beneath a magazine M in a manner to move upwardly toward the opening 180 in the magazine for engagement of the perforated face 204 with the exposed or lower face of the lowermost sleeve X therein. The heads 198 are clamped to a rock shaft 208 (see Fig. 20) journalled in the ends of arms 210 forming extensions of movable mounting elements 212 (see Fig. 21).

The elements 212 are movable, in a manner to be described, to shift the suction heads 198 from the position shown in Fig. 27 upwardly to that shown in Fig. 29, wherein the perforated faces 204 engage the lowermost sleeve in each magazine and lift it and the sleeves stacked above it upwardly to a slight extent. This action causes a small amount of relative movement between the adjacent sleeves near the bottom of the magazine and thus tends to loosen the lowermost sleeve from the stack and from the bottom support rods 176 to minimize the effort necessary for withdrawal of the bottom sleeve. In the upper position of the suction heads 198, as just described, the parts are in position for separation and removal of the lower sleeve from each magazine. This is effected by a horizontal movement of the elements 212 and the heads 198 towards the right, in Fig. 29, relatively to the magazines M, to carry or slide the lowermost sleeve in each outwardly to the rear below the respective gages 182. Such movement of the heads continues to the position P-2 indicated in broken lines in Fig. 31 where the sleeve X is clear of the magazine.

In the diagram, Fig. 26 which is oriented with Fig. 31, various positions of the centerline of shaft 208 are indicated at P, P-1, P-2, etc. and these positions correspond to similarly lettered postiions in various other figures of the drawing. The position of shaft 208 shown in Fig. 27 is indicated on the diagram at P. The movement of the parts in an upward direction to bring about engagement of the heads 198 with the sleeves in magazines M is indicated by the line P, P-1 in the diagram. Horizontal movement of the heads 198 to remove the sleeves from the magazines is accomplished by movement of the shaft 208 from position P-1 to position P-2 and the heads 198 are turned through 90° during the time that shaft 208 travels along the downwardly curved path from position P-2 to position P-3.

The sleeves X, carried flatwise by the heads 198, now stand in a vertical direction where they are directly opposed to but out of contact with a second group of three suction heads 214 (see Figs. 27 and 31). The suction heads 214 are generally similar in construction to the heads 198, each head having a suction chamber 215 communicating with suction openings 216 in the front wall thereof (Fig. 33). The suction chamber of each head is connected by a flexible hose 218 to a suction valve mechanism to be described.

Each head 214 is secured to the front face of a vertical plate 220, as shown in Fig. 27. The lower portion of the plate 220 receives a pair of horizontal spaced parallel rods 222 (also see Fig. 35) each supported in two spaced bearings or slides 224, extending upwardly from opposite ends of a bracket 226 fixed to a transverse horizontal rod 228 and properly spaced lengthwise therealong to be aligned with the corresponding heads 198 for cooperation therewith. The rod 228 is journalled at its opposite ends in a pair of brackets 230, each of which is secured to the rear end of a horizontal longitudinal bar 232, which slidably engages in and may move relatively to the movable supporting element 212. Both sides of the member 212 are provided at the front and rear (see Fig. 23) with pairs of rollers 234 and 236 for supporting and guiding the slide rods 232 within the member 212.

The suction heads 214 are mounted for limited movement relatively to the rod 228 and bars 232. Thus, as shown in Figs. 27 and 35, the parallel rods 222 each carry a spring 238 abutting at one end with the rear slide bearings 224 and secured at the other end to an adjustable collar 240. When a sleeve X is carried against a suction head 214 by a head 198, the springs 238 permit the head 214 and rods 222 to be carried back to a limited extent, the tension of springs 238 compressing the sleeve X between the heads 214 and 198. This assures good contact of the sleeve faces with the heads. Suction is now applied to the head 214 while the heads are holding the sleeve compressed between them. Suction is already on in head 198. The full line positions in Fig. 32 of the heads 198 and 214 are those occupied when the head 198 has been so moved as to bring a sleeve X into engagement with the head 214. The dotted lines 242 at the right of Fig. 32 represent the over-travel of the heads when the springs 238 are slightly compressed and suction is applied to the head 214, as stated above.

Suction having now been applied to the sleeve X by the heads 214 and 198, the heads are moved in opposite directions to the positions shown in Fig. 33, thereby expanding or opening the sleeve X as illustrated therein and in Fig. 34. The sleeves X on the three sets of heads 198 and 214 are now ready for transfer to three of the carriers 12.

The means for moving the suction heads as set forth above will now be described. The movable mounting elements 212 are connected by a cross rod 246 (see Figs. 21 and 23) the opposite ends of which extend outwardly of members 212. The members 212 are also provided with outwardly extending trunnions 247. Two pairs of parallel rock levers 244 are pivoted at their upper ends respectively on the cross rod 246 and trunnions 247. At their lower ends the levers 244 are pivoted at 248 to a spider or four-armed element 250, there being a spider 250 on each side of the cam box D. Two pairs of generally horizontally disposed parallel levers 252 are provided on opposite sides of the cam box D. The levers 252 are pivotally connected at their front ends at 254 to the spiders 250. The rear ends of the upper and lower levers 252 are fixed respectively on an idler shaft 256 and a drive shaft 258.

Shaft 256 is supported in bearings at the top of the cam box D and the lower shaft 258 passes through the box and is journalled in suitable bearings in the side walls thereof (see Figs. 16 and 17). Within the cam box D the shaft 258 has fixed thereto a lever arm 260 carrying a follower roller 262. The follower roller engages a closed cam track 264 in a face of a disc cam 266, mounted on the main shaft 34 of the machine.

Upon rotation of the shaft 34, cam 266 causes the cam follower 262 to oscillate the shaft 258 and the levers 252 to effect vertical movements of the spiders 250 to produce the vertical components of the motion imparted to the elements 212 and suction heads carried thereby.

Figure 23:
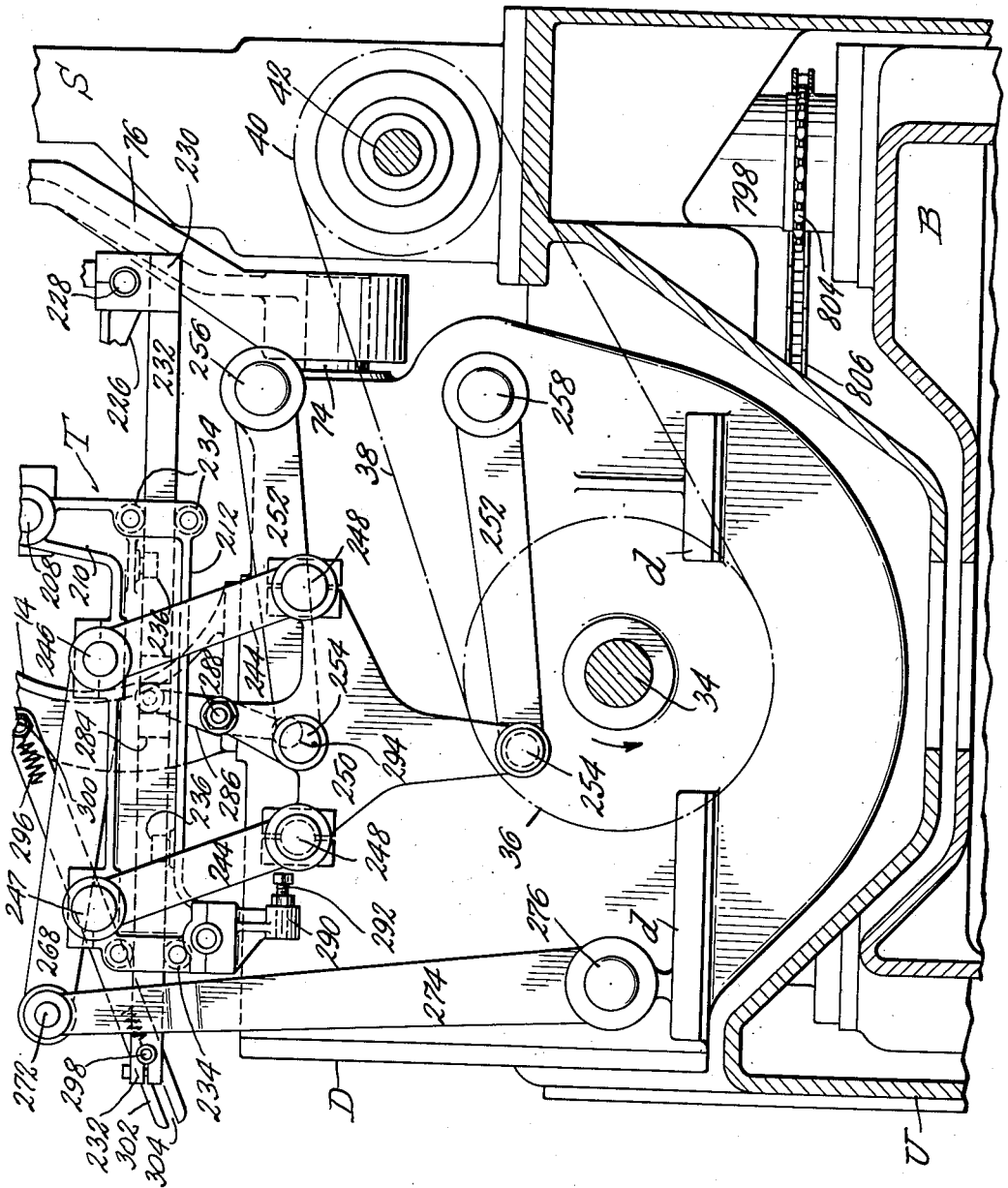
Fig. 23 is a righthand end elevation, partly in section of the machine as viewed in Fig. 20.

Horizontal components of the motion imparted to elements 212 and the suction heads 198 and 214 are produced by the following means: As shown in Figs. 21 and 23, connecting rods 268 are located on opposite sides of and generally above the cam box D. One end of each connecting rod 268 is pivoted to the cross rod 246 on the element 212, the other ends thereof being pivoted at 272 to the upper ends respectively of a pair of upright levers 274, one on each side of the cam box D. The lower ends of the levers 274 are fixed on a rock shaft 276. The shaft 276 is journalled in the cam box D and has fixed thereto within the cam box D (see Figs. 16 and 17) a lever 278 having a follower 280 running in a closed cam track 282 formed in the face of cam 266 opposite the cam track 264. Rotation of the cam 266 causes the cam follower 280 to rock lever 278, whereby the shafts 276, the vertical levers 274 and the connecting rods 268, produce the horizontal components of movement aforesaid.

As pointed out above, the slides 232 are carried by the members 212 and are movable independently thereof in generally horizontal directions. The latter movement of slides 232 is produced by the following means: Each slide 232 is provided with a block 284 having a slot or guideway therein (see Fig. 23) for loosely receiving one end of a lever 286. Each lever 286 is pivoted at 288 on one of the arms of the spider 250. Each of the mounting elements 212 has depending from its forward end a bracket 290, supporting an adjustable stop screw 292. Upon movement of the mounting element 212 to the right, as shown in Fig. 23, the stop screw 292 will engage the lower end 294 of the lever 286. Thus the slide members 232 will move in a reverse direction relatively to the members 212. Springs 296 are connected at one of their ends to a cross rod 298, and at their other ends to studs 300 fixed respectively to the stationary magazine supporting brackets 14. The studs 300 also have freely pivoted thereto the ends of a pair of angularly disposed stop bars 302 having slots 304 at their outer ends which straddle the rod 298. The springs 296 thus urge the slides 232 toward the right as viewed in Fig. 23, to the extent permitted by the abutment of rod 298 with the ends of slots 304 in the stop bars 302.

When the members 212 are moved toward the right as viewed in Fig. 23, the slides 232 and suction heads 214 will be held against movement therewith by the stop bars 302. Thus the heads 198 are moved toward the heads 214. Continued movement of the members 212 will bring the stop screws 292 into engagement with the levers 286 rocking them counterclockwise and moving the slides 232 to the left as viewed in Fig. 23, against the springs 296. This latter independent movement of slides 232 will move the suction heads 214 toward the still-moving suction heads 198 and the heads will meet as shown in Fig. 32. The sleeve X carried by each of the heads 198 will thus be confined between a pair of heads 198 and 214.

As pointed out above, the heads 214 are yieldably mounted and provision is made for overtravel of the heads 198 whereby the heads 198 and 214 are moved together into the dotted line position shown for the head 214 in Fig. 32. Suction having been turned on the heads 214 during the time that the sleeves X are held thereagainst as described above, the heads may be separated for opening the sleeves. This is effected by moving the members 212 to the left as viewed in Fig. 23. At first the heads 214 will move with the heads 198 back into the full line position of Fig. 32. Thereafter the stop screws 292 are withdrawn from the lower ends 294 of the levers 286 whereupon the slides 232 are moved toward the right as viewed in Fig. 23, by springs 296. Thus the heads 198 and 214 are moved away from each other into the positions shown in Fig. 33. In this position the sleeves X have been opened as illustrated in Figs. 33 and 34 and are ready for transfer to the carriers 12.

The mechanism for rocking the shaft 208 through ninety degrees to move the heads 198 between horizontal position (Fig. 27) and vertical position (Fig. 32) will now be described.

The shaft 208, upon which the three suction heads 198 are clamped, is suitably journalled in brackets 210 one of which extends upwardly from each of the members 212. As seen in Fig. 20, shaft 208 extends beyond the left-hand bracket 210 and has secured to it a sleeve 306. Extending from sleeve 306 is a stop arm 308 which, in the position shown in Fig. 36, is in engagement with an adjustable stop screw 312 on member 212.

Counterclockwise rotation of arm 308 into the position shown in Figs. 24 and 39 brings it into engagement with another adjustable stop screw 310 on member 212.

In Fig. 36, the position of the arm 308 corresponds to the position in which shaft 208 is supporting the suction heads 198 with their operating faces horizontally wherein sleeves may be engaged and removed sideways from the magazines M. In Figs. 24 and 39, the rotation of the shaft 208 has carried the heads 198 through 90° to present the sleeves vertically to the opposed suction heads 214.

In assembling the machine, the suction faces of the suction heads 198 are all adjusted on the shaft 208 so they are exactly in alignment in the same plane. The suction faces of the heads 214 are all similarly adjusted to occupy a vertical plane. Thus, in order to insure proper face to face engagement of the heads 198 with the sleeves in the hopper, it is only necessary to adjust the stop screw 312 to the desired extent for orienting the shaft 208 as required. The stop screw 310 is then adjusted to insure that the suction faces of the heads 198 will be brought into proper parallelism with the suction faces of heads 214 when the shaft 208 is rocked as aforesaid.

The shaft 208 is rocked by an overtravel mechanism having yielding overstroke provision at each end of the ninety-degree movement of the shaft 208. This mechanism is indicated generally at 330 in Figs. 20 and 36–41.

Referring now to Fig. 36, the operative connections between shaft 208 and the overtravel mechanism 330 include a connecting rod 314 pivoted at one end at 316 to one end of a rock arm 313 secured to shaft 208. The other end of the connecting rod 314 is pivoted to a plate 320 rotatably supported on a stud 322 carried at the lower end of a stabilizing arm 324 freely depending from shaft 208. Plate 320 is pivoted at diametrically opposite sides of the stud 322 to one end of each of a pair of parallel links 326. The other ends of the links 326 are pivotally connected at diametrically opposite sides of a shaft 344 to a plate 360 having a central hub 361 (see Fig. 37) rotatably engaging a reduced portion 362 at the end of shaft 344. The outer diameter of the hub 361 is equal to that of the shaft 344. A sleeve 346, pinned to the shaft 344 to turn therewith, extends over the hub 361 and is provided with a radially extending arm 348 on the end of which is an offset lug 349 (see Fig. 38). A second radially extending arm 352 is provided with a hub 353 rotatably mounted on sleeve 346. The arm 352 has extending from it in oppositee directions and in the same plane, lateral lugs or extensions 354 and 356.

As shown in Fig. 38, for example, there extends between lugs 354 and 349 a bolt 368 the head and nut respectively of which limit the movement of the lugs away from each other. An expansion spring 350 is carried by the bolt 368 and serves to urge the lugs apart. A similar bolt 370 is mounted between the lug 356 and a lug 369 formed on the plate 360. The bolt 370 carries an expansion spring 358 tending to force the lugs 356 and 369 apart.

Referring now to Figs. 16 and 18, the shaft 344 is journalled in a bearing 345 in the left wall of the cam box D. The shaft 344 has secured to it within the cam box a gear pinion 342 which meshes with a gear sector on the free end of a lever 336 pivoted at 338 in the cam box wall. The lever 336 carries a cam follower 334 operating in a closed cam track 332 formed in the left-hand face of cam 66 as viewed in Fig. 16. As the cam follower 334 is moved in timed relation to the other parts of the machine, the shaft 344 will be rocked to the desired extent.

In Fig. 36 the parts are shown in the position they assume when the suction heads 198 are in horizontal position with relation to the magazines M. To rock the shaft 208 to carry the sleeves into the vertical position, shaft 344 will be rocked, through the drive mechanism just described, in the direction of the arrows in said figures. This will cause the arm 348, fastened to shaft 344, to move upwardly as viewed in Fig. 40, whereby the lug 349 will pull the bolt 368 and lug 354 on the arm 352. Thus the lug 356 will compress the spring 358 against the lug 369 on plate 360, and will rock that plate about shaft 344. Rocking of the plate 360 will be transmitted through the mechanism described above to the shaft 208 whereby to move the parts into the position shown in Fig. 39. The stop arm 308 will move from stop 312 into engagement with the stop 310 thus positively limiting the rocking movement of shaft 208 and accurately positioning the suction heads 198 in a vertical position.

The shaft 344 continues to rotate through a number of degrees beyond the 90° required for the quarter-turn movement just described. For example, in the present embodiment an overtravel of 9° is provided at each end of the stroke. When the parts are moved into the vertical position as just described, the overtravel is taken up by compression of the spring 358 against the lug 369, causing a clearance between lug 356 and the adjacent head of bolt 370 as illustrated in Figs. 39 and 40.

Fig. 18 represents the position of gear sector 340 during the time that the heads 198 are in vertical position. Upward movement of the sector will cause the pinion 342 to rotate shaft 344 in the direction opposite to that just described and thus will move the parts into the position shown in Figs. 36 and 41. The arm 348 will swing downwardly as seen in Fig. 41 compressing spring 350 against the lug 354 whereupon lug 356 will pull the bolt 358 against the lug 369 to oscillate the plate 360 in a counterclockwise direction as viewed in Figs. 36 or 39. Continued rotation of shaft 344 through the overtravel described above will be taken up by compression of spring 350.

Referring again to Fig. 24 and the diagram in Fig. 25 which is oriented therewith, it will be observed that the rocking of shaft 208 through ninety degrees occurs in both instances while the shaft is bodily moving. Furthermore, such rocking occurs at two rather widely separated portions of the path of travel of the shaft 208. The linkage described above between the shaft 344 and the shaft 208 is of the knee-action type whereby to be effective at any position of the shaft 208. The overtravel mechanism 330 assures that the shaft 208 will be rocked to its full extent and that the heads 198 will be firmly held in their operative positions irrespective of such variations in leverage as may occur in the course of movement of the knee-action linkage.

The means for controlling suction for the heads 198 and 214 will now be described. In the construction illustrated, see Fig. 21, the means for this purpose include a valve 380 fixed on unit U which controls suction to the heads 198. It has an inlet passage 382 suitably attached to the ends of the three conduits 206 connected to the heads 198. A similar valve 384, having an inlet 386, is connected to the three conduits 218 for applying suction to the heads 214. Each of these valves has a passage 388 which connects with a common source of suction such as a vacuum pump (not shown).

The valve 380 is shown in section in Fig. 22, it being understood that the valve 384 may be identical therewith. The body of valve 380 has a shaft 390 upon which is fixed an oscillating slide member 392. The valve body 380 is cored to provide ports 393, 394 and 395 (see Fig. 21). The suction pipe 388 is connected to port 395. The port 395 may be connected with port 393 through a recess 396 in slide 392. Port 393 in turn is connected with passage 382. Port 394 is connected with an opening to the atmosphere.

By rocking the slide 392 in a clockwise direction from the position in Fig. 21, the connection between recess 396 and port 395 is cut off and communication is established, through recess 396, between the ports 393 and 394. In this position of the parts the passage 382, lines 206 and suction heads 198 are vented to the atmosphere. A spring 420 is provided to hold the slide in tight engagement with the valve body.

The slide 392 is urged into the position shown in Fig. 21 by a spring 418 which holds the slide against a stop 419 on the valve casing. To actuate the slide 392 a lever 400 is mounted on the shaft 390 of the valve. The lever 400 carries a cam roller 402 engageable with a cam 406 fixed to the main shaft 34 to rotate therewith in the direction of the arrow. The major portion of this cam constituting the low section thereof is concentric with the shaft and the remaining portion is in the form of a projection 407 forming a relatively short, high section. In the position of the parts shown in Fig. 21, the engagement of the low portion of the cam with the follower 402 is about to terminate. The low portion is that which holds the valve in position for applying suction to the heads 198 and is relatively long since suction must be applied to these heads through a considerable portion of a cycle during which the heads 198 engage sleeves in the magazine and hold them for transfer and opening. The high portion of cam 406 serves to cut off suction for the relatively short time required for release of the sleeves to the carriers.

On the other hand, the heads 214 are required to apply suction to the sleeves for only a short interval during the opening operation.

The valve 384 is provided with a cam follower 410 carried on an arm 412 on the valve shaft 414. A cam 416 is mounted on shaft 34 adjacent the cam 406. The cam 416 has a relatively short low section and a relatively long high section 417. It will be seen from the drawing that the follower 410 is also about to be moved to cut-off position. Thus, while suction is applied to the suction heads 198 and 214 at different times, the suction is cut off from both heads simultaneously to free the opened sleeves after they have been picked up by the carriers 12 as described hereinbelow.

Carriers

The carriers 12 have been referred to generally above. While any number of carriers may be used, it has been found to be more desirable to have a number of carriers which is a multiple of the number of pairs of suction heads 198 and 214 provided in the machine. In the present machine there are three pairs of suction heads adapted simultaneously to remove sleeves X from three magazines M and to present them in opened condition to the carriers 12. Thus it has been found desirable to provide twelve carriers whereby a particular carrier 12 will always come into operative relation with the same pair of suction heads.

As set forth above, the carriers 12 are carried by the chains 10 and driven by chains 60 through sprockets 68 and 54 on shafts 56 of the carriage C. As shown in Figs. 44 and 45, bracket members 450, having ears 452, are secured on the upper chain 10 through elongated hinge pins 449. A bracket 454, having ears 456, serves to connect the carrier 12 to the lower chain 10. The carrier brackets 450 and 454 preferably have extended ears 451 on either side provided with lock set screws 453 which engage adjacent links of the support chains 10. The screws 453 are so adjusted as to bear on said adjacent links when the chain is in a straight run, thus to steady the carriers and prevent twisting thereof. The bracket 450 is provided with bosses to clamp vertical rods 458 on opposite sides of carrier axis, one of these rods being hollow to provide a suction conduit to be described later. Below the bracket 450 is a support bracket 460 (also see Fig. 46) clamped to the rods 458 by bolts 462. Bracket 460 carries a roller 464 which rides along horizontal support rails 466. As shown in Figs. 2 and 8, the rails 466 extend, one on each side of support S, to approximately the center line of the sprocket shafts 56. The rails 466 are supported upon carriage members 54 by brackets 468 and serve to prevent sagging of the chains 10 in the runs thereof between the sprockets 64.

A pair of fingers 470 is mounted for expansion and contraction on a hinge pin 472 on each carrier 12. When contracted the fingers may be inserted into an opened sleeve X held by the suction heads 198 and 214. When expanded the fingers will carry and slightly stretch the sleeve X after it has been released from the suction heads. The expansion and contraction of fingers 470 is effected by a bracket 474 (see Figs. 44 and 45) vertically slidable on rods 458 and carrying a roller 476 which is engageable with a horizontally disposed finger control track 478. The bracket 474 has adjustably secured thereto the upper end of a pull rod 480. As shown in Figs. 49 and 57, the pull rod 480 is provided at its lower extremity with a cam member 482 disposed between and adapted to engage opposed, upwardly tapered cam surfaces 484 formed on the inner faces of levers 486 hinged at their upper ends to the hinge pin 472. Also mounted on the levers 486 are plates 488 to which are secured extensions 490 carrying the fingers 470. It will be noted that the levers 486 are crossed whereby the plates 488 and fingers 470 are in their collapsed position when the cam surfaces 484 are moved apart as in Fig. 57.

A compression spring 492 acts continually to urge the fingers 470 toward the expanded position shown in Fig. 58. In the upper, dotted line position of the cam 482 shown in Fig. 57 it holds the cam surfaces 484 apart to bring the fingers 470 together. When the cam 482 moves into such position a pivoted latch 494 having a notch 496 engages a catch 498. One end of the latch member 494 is pivoted at 500 to one of the plates 488 while the catch 498 is fixed to the opposite plate 488. As seen in Fig. 57, the latch 494 has dropped over the catch 498, being urged to do so by a spring-loaded detent 495 (Fig. 58) so that the fingers 470 will be held in their collapsed position irrespective of subsequent movement of the cam 482 into the full-line position shown in Fig. 57.

Latch 494 is provided at the end opposite the pivot 500 with an adjustable stop screw 502 which, as seen in Fig. 57, has just been engaged by a portion of the upwardly moving suction head 198. Further upward movement of the suction head 198, through its engagement with the stop screw 502, will disengage latch 494 from catch 498 and release the plates 488. This will permit the fingers 470 to expand by action of the compression spring 492 into contact with the sleeve X and hold it expanded.

A spring 504, Fig. 44, is mounted on one of the rods 458 between the relatively fixed support bracket 460 and the slidable bracket 474 to yieldingly urge the roller 476 into engagement with the finger control track 478 and also to urge the pull rod 480 downwardly. The track 478 is so contoured as to cause and permit upward and downward movement respectively of the pull rod 480.

As shown in Figs. 44, 45 and 49, one of the levers 486 is provided with an ear 506 apertured for passage of an adjustable stop screw 508 which is threaded into one of the rods 458 and is adjustably locked with a lock nut. The other lever 486 (to the left in Fig. 49) is provided with an ear 507 and a stop screw 510 in threaded engagement with the ear and secured with a lock nut. The stop screw 510 is aligned for engagement with the left-hand rod 458. The stop screws 508 and 510 serve as adjustable limit stops to establish maximum expansion of the fingers 470. It will be apparent from a consideration of Fig. 49 that the head of stop screw 508 establishes the position of the lug 506 by abutment therewith and that the free end of stop screw 510 establishes the position of lug 507 by abutment with the left-hand rod 458.

Figs. 70 and 71 illustrate the position of a sleeve X after it has been deposited on the fingers 470, vacuum being cut off to the suction heads 198 and 214, followed by separation of the suction heads 198 and 214 to release them from the sleeve. The carriers 12 to which a group of sleeves X have been thus applied, are then moved away from the magazines M and brought to the opposite side of the machine for successively placing the sleeves upon the bottle necks. During such movement the sleeves X are transferred from the fingers 270 to suitable applying devices carried by each of the carriers 12. Such applying devices include a pair of opposed, movable suction pads 512 mounted on opposite sides of the vertical axis of each carrier at right angles to the fingers 470 as shown, for example, in Figs. 44, 45, and 72–75.

In Figs. 44 and 45 the pads 512 are shown as mounted on depending levers 514 hinged to pivot studs 516 bearing in sleeves or bosses 518 on a member 520, slidable vertically on the rods 458. The levers 514 are provided with oppositely directed arms 522, the free ends of which are pivoted to the ends of an adjustable connecting rod 524. The connecting rod 524 and arms 522 are so arranged as to synchronize the levers 514 for rocking with the studs 516 simultaneously and in opposite directions.

In Fig. 45 there is shown a depending lever 526 keyed to the stud 516 on the right-hand side of the carrier 12 as viewed in Fig. 44. Referring next to Fig. 49, the lever 526 is pivotally connected by a rod 528 to a follower lever 530 through ball and socket connections 532 and 534. The follower lever 530 is fixed to a vertical shaft 536 bearing in the member 520. A roller 538 on the free end of lever 530 engages a horizontal pad-opening track 540 on standard S. A tension spring 532 (Fig. 44) connected between the levers 514 urges the suction pads 512 toward each other and through the linkage to the follower lever 530 and roller 538, and also urges the roller 538 in contact with the track 540.

When the roller 538 and lever 530 are in the position shown in full lines in Fig. 49, the suction pads 512 are in the position shown in Figs. 44 and 73. When the roller 538 is moved to the dotted line position in Fig. 49 by a suitable projection on track 540, the pads 512 take the position shown in Figs. 72 and 77.

As shown in Fig. 49, the vertical shaft 536 carries a lever 537 having an adjustable stop screw 539 which engages a projection on one of the bosses 518. The stop screw 539 limits the distance the pads 512 move away from each other when the roller 538 moves off the track 540.

Vertical movement of the pads 512 is controlled by a bracket 542, Figs. 44–45, slidable on the rods 458 and having a roller 544 in engagement with a sleeve delivery track designated generally at 546. A depending lifter rod 548 is connected at its upper end to the bracket 542 and at its lower end to the member 520. A spring 550 is tensioned between the bracket 542 and the upper part of the member 454 to keep the roller 544 in engagement with the sleeve delivery track 546.

The suction pads 512 are shown in detail in Figs. 53–55. Each pad consists of a block 552 having a suction port 554 communicating with a pair of vertical chambers 556 on either side of the port 554. Passages 558 extend from the chambers 556 to the face of the pad 512 which preferably is in the form of a grid having pockets 560 to provide large suction areas for gripping the sleeve. As seen in Fig. 53, when the fingers 470 expand the sleeve X, relatively taut, flat areas of the sleeve are presented to the grid faces of the pads 512 for ready adherence when suction is applied. As seen in Figs. 53 and 54, the grid faces are so designed that the crease lines 562 of the sleeve X will be received in vertically disposed pockets 563 to avoid the possibility of breaking the suction.

As seen in Fig. 44, the suction port 554 of each carrier 12 is connected by suitable flexible conduits 555 to the opposite ends of a cross pipe 557 secured in the rods 458. As shown in Figs. 51 and 52, the pipe 557 has a port 559 in communication with a passage 561 extending lengthwise through the hollow rod 458. The passage 561 is closed below the pipe 557. The upper ends of the passages 561 of the carriers are each connected to one end of a flexible conduit 565, see Figs. 1 and 6, the other end of which is connected to one of a group of twelve hollow ducts 567 radially and angularly disposed on a valve head 569. The valve head 569 is arranged to rotate in synchronism with the travel of the carriers about the carriage C and the ducts 567 correspond in number to the number of carriers 12 whereby to provide suction to the carriers and the suction pads 512 as required.

The valve head 569, together with its associated mechanism, is illustrated in detail in Figs. 5–7. In Fig. 5 the chain idler 62 is mounted on and drives a vertical shaft 600 journalled in the upper end of the standard S and in a bearing bracket 602 mounted on that standard. Keyed to the vertical shaft 600 is a spur pinion 604 which meshes with a gear 606 mounted on a stub shaft 608. The shaft 608 also carries a spur pinion 610 which drives a gear 612 keyed to a sleeve 614 surrounding the shaft 44 and to the upper end of which the valve head 569 is secured. Secured on the bracket 602, between the bracket and the rotary valve head 569, is a stationary valve member 616, Fig. 7. The member 616 has a segmental suction passage 618 concentric with axis of shaft 44. The passage 618 is connected to a suction supply line 620. The valve head ducts 567 for each of the carriers 12 connect with vertical ports 624 which successively come into registry with the suction passage 618 which is of a length to provide suction to pads 512 for the desired period. After passing beyond this passage each vertical port 624 registers with a vent port 622 in the valve member 616. The valve head 569 is rotated through the gearing just mentioned at the correct speed to be in synchronism with the travel of the carriers 12. The flexible conduits 565 are provided because the valve head 569 rotates continuously while the carriers 12 stop at certain points in their path of travel.

*Finger control track*

The finger control track 478, referred to above, includes one section 640 which extends across the front of the machine as shown in Figs. 2 and 59. One end of this section starts at approximately the center line of the left-hand shaft 56, extends to approximately the center line of the right-hand shaft 56, and continues concentrically around the axis of the latter shaft to the rear of the machine. Bracket members 642 and 644 support the track section 640 on the carraige members 54 to move with the carriage C. The track 478 also includes an adjustable segment 646 supported on standard S at the rear side of the machine, Fig. 8. The segment 646 is mounted for vertical adjustment on a bracket 648 shown generally in Fig. 8 and in detail in Figs. 59 and 60. As shown in Figs. 59 and 60, a stationary guide member 650 is mounted on the standard S and carries a slide member 652 which may be clamped in position by a screw 654. A pair of adjusting screws 656 and 658 are used to vertically adjust the slide 652 when the clamp screw 654 is loosened. After proper adjustment has been made, the clamping screw 654 is tightened.

Sleeve delivery track

The sleeve delivery track 546, Figs. 2 and 61, includes a carriage-supporting section 656 which extends across the front of the machine and has end portions concentric with the carriage shafts 56. As shown in Figs. 8 and 61, these concentric portions terminate at the rear inwardly beyond the center lines of the shafts 56, forming end portions 660 and 662. The track thus far described is mounted by bracket members 664 and 666 to the members 54 and moves back and forth with the carriage C. The track 546 also has an adjustable section 668 mounted upon adjustment means 670 on the rear of the standard S. The adjustment means 670 comprises a bracket 672 (Fig. 62) having spaced bearings 674 and 676 for rotatably mounting a vertical screw shaft 678 against vertical displacement. A bracket 680 is threaded on this shaft and may be secured thereto by a lock nut 682. A short central portion 683 (Fig. 61) of the track section 668 is hingedly mounted to the bracket 680 by screws 684. Oppositely inclined track portions 686 (Fig. 8) are mounted at their inner ends to the screws 684 and have their outer ends slidably mounted at points 688 to stationary right and left-hand track extensions 690 and 692. These extensions 690 and 692 of the section are mounted by brackets 694 and 696 (Fig. 61) to the standard S. The bracket 714 mounted on the standard S. The stationary section 706 overlaps the part 712 at one end and at its other end is slotted at 716 to receive the extension 718 of the opposite end track portion 713. The section 713 of track 540, being mounted on the left-hand shaft 56, is held against rotation therewith by a bar 722 which secures it to the section 718 (see Fig. 64). Low portions 728 and high portions 730 are formed on the portion 713 of track 540 for purposes to be explained hereinbelow. The stationary part 708 of the track 540 is mounted on the standard S by threaded rods 732 engaging bracket 734 projecting laterally from the standard S. Lock nuts 736 are provided to adjust the track 708 toward and away from the standard S. The track section 708, as shown in Fig. 64, is provided with a low cam portion 738 and a high cam portion 740 connected by an inclined portion 739. As shown in Figs. 8 and 65, the track portion 708 is relatively wide to accommodate vertical movements of the roller 538 on lever 530 of the pad-opening and closing means of each carrier.

Hold-back conveyor

The hold-back conveyor 158 has been generally described above and is shown in Figs. 10 through 15. This conveyor 158 is associated with the conveyor 20 and, as pointed out above, is arranged to run at a linear speed less than that of the conveyor 20 in order to hold back and properly position the bottles with respect to the carriers 12. In order that the holders 171 and 172 carried respectively by the chains 162 and 160 may correctly engage bottles of various heights, means is provided for vertically adjusting the threaded for the reception of an internally threaded sleeve 768 (see Figs. 12 and 13). Each of the sleeves 768 has at its lower end a sprocket 770 which engages an endless chain 772 to connect the sleeves 768 for simultaneous rotation. The sleeves 768 are mounted for rotation in bearings 774 secured to the conveyor frame 21. Upward vertical movement of the sleeves 768 is prevented by abutment of the sprocket 770 with the lower faces of the adjacent bearing 774. In the case of the sleeve carried by the rod 766, downward vertical movement is prevented by suitable lock nuts 775 arranged to bear upon the upper surface of the bearing 774. In the case of the sleeve 768 carried by the rod 764, a hand-wheel 776 is arranged above the bearing 774 and includes a hub portion which rests upon the upper surface of the bearing 774. Lock nuts 777 are provided above the hand-wheel in order to secure the hand-wheel to the sleeve 768. Thus upon rotation of the hand-wheel 776 both of the sleeves 768 will be caused to rotate and the internal threads therein will cause vertical movement of the rods 764 and 766 in upward or downward direction depending upon the direction of rotation of the hand-wheel 776. Such vertical movement of the rods 764 and 766 will produce corresponding vertical movement of the upper casting 758 and the holders 172.

The chains 160 and 162 must be driven at the same linear speed and means is provided to maintain continuous driving relationship with the upper vertically adjustable chain 160. To this end the sprocket 157 (see Fig. 10) is connected to the vertical drive shaft 154 as shown in Fig. 15 by means of a key 784 which enters an elongated keyway in the shaft 154. The key 784 is carried by a sleeve 782 which bears in the casting 758. At its lower end the sleeve 782 is provided with a flange 783 which rests against the lower surface of the casting 758. At its upper end the sleeve 782 is connected as by a key 785 to the sprocket 157. With the construction just described, the casting 758 and the parts carried thereby may be moved vertically relative to the shaft 154 without disturbing the driving connection between said shaft and the sprocket 157. The lower sprocket 156 may be clamped to the shaft 154 as by a screw 780 inasmuch as no provision is herein made for vertical adjustment of said lower sprocket.

The vertical adjustment so far described for adaptation of the machine to bottles of varying heights is provided primarily because the conveyor 20 may be so associated with other equipment in a given plant that it cannot be vertically adjusted. For this same reason it is desirable to provide means whereby all other portions of the present machine which operate on or are associated with the bottles may be vertically adjusted to accommodate bottles of different heights. Thus, referring to Fig. 1, the unit U and all of the parts carried thereby, including the cam box D and the standard S, is mounted on the base B for vertical adjustment relative thereto. Such vertical adjustment as shown particularly in Figs. 16, 19 and 21, may be accomplished by supporting the unit U upon four fixed vertically-extending posts 790 fixed to the base B. Two of the posts 790 may be seen in Fig. 21 and as indicated in Fig. 19, the posts 790 are preferably arranged in the base B in a generally rectangular form. The posts 790 are all alike and one of them is shown in detail in Fig. 16. As shown in said Fig. 16, the post 790 is provided with an externally threaded lower portion and a smooth-surfaced upper portion 794 having a smaller diameter than that of the lower portion. A shoulder 796 extends between the upper and lower portions just described. At the lower end the post 790 rests upon the frame B and may be secured thereto as by welding. A sleeve 798 surrounds the lower threaded portion of the post 790 and is provided with an internally threaded portion 799 which engages the threads on the lower portion 792 of the post 790. The sleeve 798 is provided with a sprocket 804. An endless sprocket chain 806 is arranged to extend around all four of the sprockets 804 provided respectively upon the sleeves 798 (see Fig. 19) whereby to connect the sleeves 798 for simultaneous rotation. The unit U is provided with four cap-shaped portions having openings to receive the smooth upper portions of the posts 790. A ball thrust bearing 802 is provided between the inner upper surface of the cap portions 800 and the upper rim of the sleeve 798. Thus when the sleeves 798 are rotated, they will ride upwardly upon the threads on the posts 790 and through the thrust bearings 802 will be effective to raise the entire unit U.

The chain 806 is suitably connected to a device for moving the chain and raising and lowering the unit U as described above. To this end the unit U as shown in Fig. 21 carries a bracket 808 in which is journalled a horizontal shaft 810 having at its outer end a hand-crank 812. At its inner end the shaft 810 has fixed thereto a bevel pinion 814 meshing with a bevel gear 816 secured to the upper end of a vertical shaft 818 journalled in the bracket 808. The lower end of the shaft 818 has fixed thereto a sprocket 820 meshing with the chain 806. It will be apparent that rotation of the hand-crank 812 will be effective to move the chain 806 and thus to raise and lower the unit U. Inasmuch as the hand-crank 812 and the parts just described are carried by the unit U, the sprocket 820 will remain in mesh with the chain 806 during such vertical movement. A take-up sprocket 822 (see Fig. 19) is suitably mounted in the unit U for the purpose of taking up slack in the chain 806 in a well-known manner. Referring briefly to Fig. 1, it will be observed that the speed change device 31 is swiveled on the unit U in order to maintain constant driving connection with the motor 30 irrespective of the vertical adjustment described above.

*Carrier chain locking device*

Horizontal reciprocation of the carriage C is relied upon to hold a group of carriers 12 stationary relative to the magazines M at the time the opened sleeves are transferred to the carriers. While it is possible to construct the carriage moving mechanism with such accuracy that the carriers 12 will be maintained absolutely stationary at this time, it has been found to be more practical to provide a simple mechanism for intermittently locking the chains 10 while transfer is being made. In Figs. 1 and 6 the chain-locking device is indicated generally at 850. This device is secured to the standard S in such position as to cooperate with the run of the chain 60 which is subjected to intermittent movement as a result of reciprocation of the carriage C. The locking device 850 thus is stationary both with regard to reciprocation of the carriage C and movement of the chain 60. The locking device 850 may include any suitable devices for engaging the links of the chain 60 only at such times as the chain is supposed to be stationary. As shown in Fig. 5, the locking device 850 is provided with a bracket 852 secured as by screws 854 to the standard S. Referring now to Figs. 42 and 43, the locking device 850 comprises a casting 856 having a slideway for the reception of a slide 858 which may be confined therein as by a plate 890 fastened by screws 892 to the casting 856. The slide 858 has secured at the forward end thereof a chain-engaging head 894 having formed thereon a series of teeth 896 arranged to enter several adjacent upper and lower links of the chain 60. The casting 856 is formed with a forwardly extending portion 898 which overhangs the chain 60 and extends into horizontal alignment with the locking head 894. The extension 898 may have formed thereon a series of teeth 900 adapted to mesh with the links of the chain 60. The teeth 900 are so positioned with respect to the chain 60 as not to engage the same unless the chain is moved toward the left as viewed in Figs. 42 and 43, such movement to the left occurring only when the slide 858 is moved for locking the chain as will be described hereinbelow.

At its opposite end the slide 858 is yieldably pivoted to one arm of a bell crank lever 902 arranged to rock about a pin 904 carried by an extension 906 of the plate 890. To this end the bell crank lever may be provided with a pin 908 of a diameter smaller than that of a pair of aligned holes 910 formed in the bifurcated end portion of the slide 858. The slide 858 has formed therein a bore 912 which receives an expansive spring 914 and a plunger 916 against which the arm of the bell crank 902 is adapted to bear. The spring 914 is effective to move the plunger 916 to the right as viewed in Fig. 43 and thus to maintain the pin 908 in the rearward position within the holes 910 as illustrated in Fig. 42. When the bell crank 902 is rocked to move the slide 858 forward into locking engagement with the chain 60, such movement will be effected through the spring 914 whereby the locking teeth 896 will be brought into yielding engagement with the chain 60. Thus in the event the chain 60 is not exactly aligned with the teeth 896, yielding of the spring 914 will avoid damage to the parts and will be effective to shift the chain 60 into such position as to be securely locked between the teeth 896 and 900.

The bell crank lever 902 is pivotally connected at 916 to the upper end of a plunger 918 guided for vertical movement in a lug 920 formed on a bracket 922 secured to the standard S. An expansive spring 924 is arranged between the lug 920 and the upper end of the plunger 918 whereby constantly to urge the bell crank 902 in a clockwise direction and thus to urge the locking slide 858 into its inoperative position wherein the teeth 896 are withdrawn from the chain 60. The bell crank lever 902 is also pivotally connected at 926 to the upper end of a link 928 the lower end of which is pivoted at 930 to a rocker 932 pivoted at 934 to a standard 936 in the unit U. At its opposite end the rocker 932 is provided with a roller follower 938 which bears against a cam 940 fixed for rotation with the shaft 34. The cam 940 is provided with a concentric portion 942 of such diameter as to permit the spring 924 to hold the locking slide 858 in its inoperative position aforesaid. The cam 940 is provided with a high portion 944 which is effective through the roller follower 938 to rock the rocker 932 and through the link 928, to rock the bell crank 902 in a counterclockwise direction whereby to move the slide 858 forwardly into locking engagement with the chain 60. The high portion 944 in the cam 940 is so angularly positioned upon the shaft 34 as to cause locking of the chain in proper timed relation with reciprocation of the carriage C whereby to hold the chain stationary during the time that the carriage C is moved in a direction opposite to that in which the carriers 12 are ordinarily driven. In this manner it is assured that the carriers 12 will be held stationary during transfer thereto of the sleeves X.

*Suction head details*

The suction heads 198 and 214 have been generally described above but it has been found to be advantageous to construct these heads in a particular manner in order to facilitate opening of the sleeves X preparatory to transfer thereof to the carriers 12. In application Serial Number 555,188, filed September 21, 1944, by Allen et al, there is disclosed a particular mechanism for effecting the opening of banding sleeves of the type involved in the present application. In said application Serial Number 555,188, it is pointed out that these banding sleeves are ordinarily supplied in collapsed form. They are usually wet and extremely slippery in nature. When these sleeves are tightly collapsed, the separation of the walls is particularly difficult and it has been found that for automatic operation in a machine it is essential that the separation of the walls be started in a small area. Thus in said application Serial Number 555,188 the suction heads are given a relative facewise movement to twist the sleeve therebetween. In the present machine the suction heads 198 and 214 are so designed as to initiate peeling of the sleeve walls adjacent the open edges thereof after which the walls may be easily separated merely by moving the suction heads 198 and 214 away from each other as described in an earlier part of this specification. The construction herein disclosed dispenses with the necessity for relative motion between the suction heads in such direction as to impart a twisting motion to the sleeves.

The suction head 198, as shown for example in Figs. 28, 29 and 30, is provided with the perforations 202 and inner chamber 200 described above. It will be observed that certain of the perforations 202 are arranged in the face of wall 204 as a row extending substantially centrally and throughout the longer dimension of the face 204 and that additional perforations 202 are formed adjacent the four corners of said face. Reference to Fig. 30 will reveal that the dimensions of the sleeve X are such that the creased edges thereof extend for a substantial distance on either side of the face 204 and that a line of concentrated suction effect along the row of perforations 202 extends centrally of and parallel to such creased edges. The four corner perforations 202 serve to open the sleeve X into the contour illustrated, for example, in Fig. 34, but it will be appreciated that the principal effort is exerted along the central line of the sleeves as disclosed above.

Adjacent the upper and lower edges, respectively, of the face 204 of the suction head 198, there are provided notches 950 which, as shown in Fig. 29, flare outwardly into the edges in which they are formed. A perforation 202 extends from the suction chamber 200 into each of the notches 950 in a portion thereof as close as is reasonably possible to the outward flared end of each notch. It will be apparent that when suction is applied as in Fig. 29, the major portion of the sleeve X will lie in a flat plane across the face 204 of the suction head 198. A centrally located narrow zone of the open edges of the sleeve will be deflected into the notches 950 by the action of the perforation 202 located therein whereby such open edges will assume the contour shown illustratively in Fig. 30. Inasmuch as the suction is applied to the outer surface of only one of the walls of the sleeve X, it will be apparent that there is an immediate tendency toward separation of the walls in the area affected by the notches 950. In the operation of the machine the suction head 198 is moved away from the magazine M to carry the sleeve adhering thereto into abutment with the suction head 214 as illustrated generally in Fig. 31, for example. When the suction heads 198 and 214 are brought together as shown in Fig. 32, suction is applied to the head 214. The head 214 desirably is identical in regard to the provision of perforations and notches therein with the head 198. Thus, as clearly shown in Figs. 83 and 84, the faces of the suction heads 214 are provided with perforations 216 and with outwardly flared notches 954 in the upper and lower edges thereof as described in connection with the heads 198. Thus, when a sleeve X is brought into engagement with a suction head 214 and suction is applied thereto, the wall of the sleeve X opposed to that adhered to the head 198 will become adhered to the head 214. The cut or open edges of this wall will be exposed to suction exerted by the perforation 216 lying within each of the notches 954 and will be drawn away from the opposed wall portion lying in the notch 950 in the head 198. The position of the sleeve X just described is illustrated in Fig. 32. From an inspection of this figure it will be observed that separation of these small portions of the sleeve walls adjacent the upper and lower open edges thereof will serve to initiate separation or peeling of the remaining areas of the opposed walls. The peeling action thus initiated will very readily continue along the row of perforations and utimately throughout the sleeve when the heads 198 and 214 are moved apart as illustrated in Figs. 33 and 34. It has been found that the wet, slippery sleeves X are very readily separated by a simple, horizontal movement of separation between the heads 198 and 214 when the faces of such suction heads are constructed as described above. The concentration of suction effect along opposed central lines of the opposite surfaces of the sleeves has been found to be quite effective without the notches 950 and 954. However, operation is more reliable particularly with sleeves of various thicknesses and materials when notches such as 950 and 954 are provided. It will be apparent that the particular layout of suction perforations and the particular contour of the notches herein disclosed may be changed in detail without departing from the novel principles involved.

A further detail of suction head design will now be described which detail has been found to be preferable from the standpoint of reliable operation of the machine. It will be appreciated that the suction heads 198 are first brought into contact with sleeves X at the magazine M wherein they are stacked as described above. The stack of sleeves serves as a resilient backing for the lowermost sleeve therein. Thus there is very little likelihood of a suction head 198 failing to pick up a single sleeve X and carry the exposed face of such sleeve into contact with the suction face of the corresponding suction head 214. However, it will be apparent that there may be more likelihood of failure on the part of the suction head 214 to properly adhere to the sleeve face presented thereto. The result of such failure would be that this particular sleeve would not be opened and would remain in closed position upon the head 198. It has been found desirable to make the perforations 216 in the faces of the suction heads 214 slightly larger in diameter than the perforations 202 in the suction faces of the heads 198. Alternatively each of the perforations 216 may be countersunk in the suction face. Either of these procedures will result in providing a greater area on which the suction exerted by the heads 214 will be effective. Such increase in effective area has been found to make adherence of the exposed face of the sleeve X to the suction surface of a head 214 more certain and thus the number of failures to open sleeves may be very markedly reduced.

Any remaining failures to open sleeves either due to defective sleeves or other causes will result in leaving an unopened sleeve adhered either to the face of a head 198 or to the face of a head 214. If the unopened sleeve remains adhered to the head 198, it will be carried thereby back to the magazine M and will, of course, prevent the head 198 from picking up a new sleeve in the next cycle of operation. If the unopened sleeve happens not to be defective, the likelihood is that it will be opened in the next cycle of operation but if it is not, it will soon become apparent to the operator of the machine who may remove the unopened sleeve from the suction head 198 without the necessity for stopping the machine. However, the suction heads 214 are not readily accessible and in the event an unopened sleeve remains adhered to one of these heads, which is likely to occur particularly when the suction heads 214 have a greater effective area than the heads 198, it would usually be necessary to stop the machine were it not equipped with the sleeve-stripping mechanism now to be described. Such sleeve stripping mechanism is effective to remove any unopened sleeves which might remain adhered to any of the suction heads 214. The percentage of failure of the machine to apply sleeves to bottles may be most effectively reduced by providing a greater suction area on the suction heads 214 as suggested above, thus increasing the likelihood that unopened sleeves will remain adhered to these heads rather than to the heads 198 and providing a sleeve-stripping mechanism to remove any such sleeves from the heads 214 during each cycle of operation.

*Stripping device for unopened sleeves*

Referring now to Figs. 83 through 86, two of the suction heads 214 are illustrated and it will be understood that the mechanism associated therewith will be associated with all of the suction heads 214 provided in any given machine. In the present machine there are provided three suction heads 214 with each of which the mechanism to be described is associated. It will be recalled that the suction heads 214 are mounted for movement with and relatively to the supporting element 212 of the transfer mechanism, being carried at the rearward ends of horizontal bars 232 mounted for longitudinal movement relatively to the elements 212 (see Fig. 23). Each of the bearing brackets 230 has secured thereto a bearing 960 only one of which is shown in Figs. 83–85. A transversely extending rock shaft 962 is mounted in the bearings 960 and extends in close to and beneath the suction heads 214. At each of its outer ends the rock shaft 962 is provided with retaining collars 964 (only one of which is shown in the drawings) for securing the rock shaft against longitudinal movement within the bearings 960. One or both of the retaining collars 964 may be provided with perforated lugs 966 between which and a suitable stud 968 on the end bearing 230 may be stretched a contractile spring 970 tending to rotate the rock shaft 964 in a clockwise direction as viewed in Fig. 85.

The rock shaft 962 has secured thereto a plurality of vertically extending fingers 972 one of which is disposed on each side of each of the suction heads 214 as clearly shown in Fig. 84. The fingers 972 may be made of wire and clamped to the rock shaft 962 by means of a flat bar 974 secured to a flattened face of the rock shaft 962 as by a screw 976 (see Fig. 86). At its upper end each of the fingers 972 is provided with a rearwardly directed portion 978 adapted to bear against a portion of the associated suction head 214 under the influence of the spring 970 thus normally to dispose the vertical portion of each of the fingers 974 in the position shown in full lines in Fig. 85.

The spacing longitudinally of the rock shaft 962 between each pair of fingers 972 associated with each of the suction heads 214 is less than the width of a sleeve X, as shown in Fig. 84, whereby counterclockwise rocking of the shaft 962 will be effective to bring the fingers 972 into engagement with the rear face of a sleeve which might happen to remain adhered and unopened upon the suction face of one of the heads 214.

As described above, suction is cut off from the head 214 at the time that the sleeves X are transferred to the fingers 470 of a carrier 12. In the event, however, a sleeve remains unopened and adhered to a suction head 214, it will not be picked up by the fingers 470 and very likely will remain adhered to the face of the head 214 even after suction has been cut off, it being recalled that the sleeves X are wet and sticky in nature. However, since suction is cut off, it will be apparent that counterclockwise rocking of the fingers 272 as described above will be effective to dislodge the unopened sleeve from the suction head 214 as illustrated in broken lines in Fig. 85.

Any suitable means may be provided for producing counterclockwise rocking of the fingers 972 at an appropriate time in each cycle of operation. As shown herein this may be very simply effected by providing on the rock shaft 962 an arm 980 extending rearwardly toward the standard S. The standard S has secured thereto a stop 982 provided with a laterally turned end portion 984 so disposed as to be engaged by the arm 980 when the suction heads 214 move downwardly in their cycle of operation. Brief reference to the motion diagrams in Figs. 25 and 26 will reveal that the shaft 208 in the transfer mechanism moves vertically upwardly in one path and moves downwardly in a path disposed forwardly thereof. However, the suction heads 214 do not follow the path of travel shown in said Figs. 25 and 26, it being recalled that the heads 198 and 214 move respectively rearwardly and forwardly away from each other in the sleeve-opening operation and for this reason heads 214 move vertically downwardly in a path which lies closer to the standard S than does the path in which these heads move vertically upwardly before the movement of separation which should result in opening of the sleeves. Accordingly, on each upward vertical movement of the heads 214, the arm 980 will clear the stop 984 but on each downward movement thereof, the head 214 having been moved to the right as viewed in Fig. 85, the arm 980 will strike the stop 984 and produce counterclockwise rocking of the shaft 962 for the purpose of stripping any unopened sleeves from the suction faces of any of the heads 214.

*Operation*

The operation of the various components of the machine has been described above in connection with the detailed description of said components. Accordingly the operation of the machine as a whole will be rather briefly described hereinbelow. The simultaneous movement of a group of sleeves, in the present instance three sleeves X, from the magazines M to the position wherein they are to be opened for application to the fingers 470 on three of the carriers 12, has already been explained. In the path diagrams in Figs. 25 and 26 the point P-3 represents the location of the center line of shaft 208 when the transfer mechanism is in this position. The point P-4 represents the position of shaft 208 corresponding to Fig. 32 wherein the faces of the suction heads 198 and 214 have been brought together with a sleeve confined therebetween. The valve mechanism described above will be effective to apply suction to the head 214 at this time, it being understood, of course, that suction has been applied to the head 198 from the time the latter head was brought into engagement with the lowermost sleeve in a magazine M. Movement of the shaft 208 from point P-4 to point P-5 initiates separation of the heads 198 and 214 to open the sleeve. The carriers 12 on the front of the machine, as viewed in Fig. 1, are brought to rest at this time by movement of the carriage C toward the right as described above and the locking mechanism 850 is operated to hold said carriers steady. The fingers 470 of three of the carriers 12 are collapsed and in vertical alignment with the three partially opened sleeves X. The transfer mechanism in the meantime moves upwardly while opening of the sleeves is completed thus to place the opened sleeves in telescopic relation with the sets of fingers 470. At the completion of this movement the shaft 208 has moved to point P-6 and the parts have assumed the position shown in Fig. 24. However, just before such movement is completed, the sleeves X and aligned fingers 470 are disposed as shown in Figs. 68 and 57. In said Fig. 57 the fingers 470 are held in collapsed position by the latch 494. As upward movement continues, the head 198 abuts the screw 502 and releases the latch 494 whereupon the fingers 470 expand to the position shown in Figs. 58 and 70 and upward movement of the transfer mechanism ceases. Fig. 58 thus corresponds to Fig. 24 and to the position P-6 in Fig. 25. Suction is now cut off from the heads 198 and 214 leaving the sleeves X to be supported by the carrier fingers 470.

The transfer mechanism then starts to move from point P-6 toward point P-7, the horizontal component of such movement causing the suction heads 198 and 214 to move away from each other, as shown in Figs. 70 and 71 to clear the sleeves X and incidentally, to bring the sleeve-stripping lever 980 (Fig. 83) into vertical alignment with the stop 984. The heads 198 and 214 are then moved downwardly as the shaft 208 is moved toward the position P-7, resulting in operation of the sleeve-stripping mechanism and rotation of the heads 198 through ninety degrees preparatory to taking another group of sleeves from the magazines M as described above. Horizontal movement of the shaft 208 from point P-7 to point P brings the heads 198 beneath the magazines M and vertical movement from point P to point P-1 brings the heads 198 into engagement with a new group of sleeves X as described above.

A complete cycle of operation of the carriage C for the purpose of successively positioning groups of three of the carriers 12 for reception of opened sleeves X will now be described starting at the position of the machine wherein a group of sleeves X is about to be opened and transferred to a group of carriers 12 held stationary with respect to the transfer mechanism. Such cycle of operation is illustrated in Figs. 78 through 82. In Fig. 78 it will be observed that there are twelve carriers 12 of which six have been identified consecutively by the letters a, b, c, d, e and f. In Figs. 78–82 the lower portion of the figure represents the front of the machine as observed in Fig. 1 and thus represents the side of the carriage C to which the opened sleeves are presented by the transfer mechanism. In said Figs. 78–82 the carriers a, b and c are each assumed to have positioned on the fingers 470 thereof a sleeve X. In all of the said Figs. 78–82 positive signs associated with the carriers indicate that the carriers are moving while negative signs indicate that the carriers are stationary. The directions of movement of various parts are indicated by proper arrows.

It will be recalled that the carrier chain 10 is so driven through the drive chain 60 that the run of carrier chain 10 extending along the rear side of the machine (the upper portion of Figs. 78–82) progresses at a steady, uniform rate of speed. So long as the carriage C remains stationary the run of chain on the front of the machine will also move at this same rate of speed. However, when the carriage is moved to the right as viewed in Figs. 78 through 82 at a linear speed equal to the normal linear speed of the chain, the run thereof on the front of the machine will remain stationary. When the carriage C is moved to the left, the run of chain on the front of the machine will move at a speed equal to the normal chain speed plus whatever linear speed is imparted to the carriage C, the average rate of progress of the run of chain on the front of the machine, of course, being equal to the normal linear speed imparted to the chain by the drive mechanism.

The position of parts illustrated in Fig. 78 is that in which the carriers d, e and f have just been brought to rest in alignment with the transfer mechanism and magazines M. The carriage C therefore has just started movement to the right as indicated by the arrow on rod 52. The carriers a and b are progressing around the left-hand sprocket 64 while the carrier c remains stationary for the moment. The carriers along the rear of the machine are progressing at a uniform rate of speed in alignment with the conveyor 20 as indicated by the arrow.

In Fig. 79 the carriage C is continuing its movement to the right and the carriers d, e, and f remain stationary while transfer of opened sleeves to the fingers 470 thereof is being effected. The carriers a and b continue to move around the left-hand sprocket 64 and the carrier c has just reached the sprocket 64 although motion of the carrier c has not yet started.

In Fig. 80 the carriage C has completed its movement to the right, has come to rest, and has just started movement to the left. It will be understood that immediately the carriage C is decelerated and comes to rest, the carriers d, e and f will start to move toward the left and that when the carriage C starts its movement toward the left, these carriers will have assumed a rate of travel greater than that of the normal speed of the chain. The carrier a has left the sprocket 64 and is now moving in alignment with the conveyor 20 while the carriers b and c are both moving around the left-hand sprocket 64. At this time, of course, the transfer of the sleeves has been completed and the transfer mechanism has moved downwardly to clear the carriers.

In Fig. 81 the carriers d, e and f have progressed well away from the transfer positions and the transfer mechanism is moving forwardly of the machine preparatory to picking up a new group of sleeves X.

In Fig. 82 the carriers d, e, and f have moved substantially into the positions occupied by the carriers a, b and c in Fig. 78 and the three carriers next succeeding the carriers d, e, and f have moved substantially into position for the reception of a new group of sleeves.

It will be apparent from the foregoing that the cycle of operation of the carriage C occurs at the same frequency as the cycle of operation of the transfer mechanism whereby a set of three sleeves is presented by the transfer mechanism to successive groups of three of the carriers 12.

The cycle of operation of the carriers wherein they are effective to pick up sleeves from the transfer mechanism, carry them around to the rear side of the machine, apply them to the bottles positioned on the conveyor 20 and return to proper position for the reception of a new group of sleeves X, occurs at a frequency substantially less than the frequency of operation of the transfer mechanism. As explained above, there are twelve carriers on the carrier chains 10 and thus it will take each group of three carriers four times as long to complete a cycle around the machine as it takes for one complete cycle of operation of the transfer mechanism or carriage mechanism. A substantial portion of this longer period of time may be devoted to handling of the sleeves by the carriers and the application thereof to the bottles. It is posible, therefore, to run the machine at such a rate of speed that the time required for delivering the sleeves from the magazines to the carriers is the limiting factor. Since three or more sleeves may be delivered simultaneously, the productive capacity of the machine is three or more times greater than that of a machine in which the sleeves are handled singly.

A complete circuit of a carrier 12 around the carriage C will now be described. The various supporting and cam rails or tracks described in detail hereinabove are effective to support the carrier 12 and to cause operation of its parts in the course of travel around the carriage. During the time that the carrier is in the front run of the supporting chain 10 and thus, during the time that an opened sleeve is transferred thereto by the transfer mechanism, the carrier is supported by the front section of the supporting rail 466 (see Fig. 2). The sprockets 64 serve to support the carrier during the time that it travels around either of the sets of sprockets. After leaving the left-hand sprocket 64, the carrier moves along the rear side of the machine in alignment with the conveyor 20 and within this zone of travel the carrier is supported by engagement of the roller 464 thereof on the straight rear section of the track 466 (see Fig. 8 which constitutes a rear view of the machine). In both the front and rear straight runs the carrier is additionally supported and guided by the roller guide track 700 as described above.

As a carrier 12 leaves the work station at which the opened sleeve is transferred thereto by the transfer mechanism, it moves intermittently with the other members of the particular group within which it is located until such time as it has passed entirely around the left-hand sprocket 64. However, other than this intermittent movement with the group, all other operations of the carrier are individually carried out as the carrier moves in proper succession through its complete path of travel around the carriage. For this reason the present portion of the description of the operation will be limited to a single carrier.

As the carrier 12 moves away from the work station, as aforesaid, the roller 538 located near the lower end of the carrier, rides along the stationary portion 706 of the carrier pad opening track 540 shown in Fig. 64. It will be recalled that Fig. 64 is transposed and corresponds with the rear view of the machine as seen in Fig. 8. Thus, in moving away from the magazines, the carrier progresses toward the right, as viewed in Fig. 64, along the stationary portion 706. As the carrier approaches the left-hand end of the machine, the roller 538 leaves the track portion 706 and engages the extension 718 of the left-hand cam portion 713. The roller 538 then enters the low portion 728 and the suction pads 512 move toward the sleeve as shown in Figs. 73 and 74. At this moment suction will be applied to the suction pads through operation of the valve head 569 with the valve body 616. In order to assure good adherence between the suction pads and the sleeve the cam portion 713 is provided with alternating high spots 730 and low spots 728. Thus the suction pads are repeatedly moved toward and from the sleeve during the time that the carrier moves around the left-hand end of the machine. It will be noted by referring to Fig. 74 that the separation between the fingers 470 is sufficient to permit the suction pads 512 to force portions of the walls of the sleeve X between the fingers thereby stretching the sleeve taut and presenting flat surfaces to the faces of the suction pads 512. In Fig. 75, the position of the pads 512 is that assumed when the roller 538 engages one of the high spots 730 on the cam portion 713.

As the carrier 12 moves on around the machine to the rear side thereof, the roller 538 will leave the last low spot 728 of the cam portion 713 and next will engage the portion 738 of the rear section 708 it being understood that, depending upon the relative position of the carriage C and the rear section 708, the roller 538 may be out of contact with any portion of the control track 540 for a short period of time during which the suction pads 512 remain pressed against the taut faces of the sleeve X. When the roller 538 strikes the cam section 738, it will be moved thereby to separate the suction pads 512 to such an extent as to open the sleeve X sufficiently to be placed over the neck of a bottle. In the meantime the finger control roller 476 is operated by the finger control track to partially collapse the fingers 470. Thus in Fig. 8 it will be observed that the portion 646 of the finger control track 478 is provided with an inclined portion sloping upwardly from the left-hand end of the machine (right-hand end as viewed in said Fig. 8). The finger control roller 476 rides up this incline causing the rod 480 (see Fig. 44) to raise the cam member 482 between the cam surfaces 484 (see Fig. 57). The extent of this movement is such as to move the fingers 470 into a partially collapsed position in which they define substantially the diameter of the cap or bottle top to which the sleeve X is to be applied. In this position the fingers 470 serve as a guide for the sleeve as it is moved downwardly and over the bottle top as described hereinbelow. The partial collapsing of the fingers 470 also permits the separation of the suction pads 512 as described above whereby the sleeve X is brought into substantial cylindrical form.

The position of the parts just described is shown in Fig. 76. This position also corresponds to the position indicated in Fig. 8 by the vertically aligned group of rollers 544, 476 and 464 in which the roller 544 is about to move down the inclined portion 686 of the sleeve delivery track 546. As this particular carrier continues moving (to the left as viewed in Fig. 8), the roller 544 will ride down the section 686 carrying the suction pads 512 downwardly relative to the fingers 470 and the neck of the bottle positioned therebeneath, thus bringing the parts into the position illustrated in broken lines in Fig. 77.

If so desired, the suction pads 512 may each be provided with a concave roller 566 mounted on the lower end thereof as shown in Figs. 72-77 as well as in Figs. 55 and 56. In the latter figures it will be apparent that the rollers 566 extend inwardly of the vertical plane of the suction faces of the respective pads 512 with which they are associated. The rollers 566 therefore will engage the neck of the bottle or the cap secured thereto and will serve to center the bottle neck and the suction pads 512 for efficient application of the sleeve, avoiding, for example, abutment of the lower edge of a sleeve with a bottle top or cap top.

The extent of downward movement of the suction pads 512 will determine, of course, the extent to which the sleeve X is applied to the bottle. In some instances it may be desired to so apply the sleeve as that it will shrink into engagement with the upper part of the bottle neck and a portion, at least, of a screw cap or cork flange or the like. In other cases it may be desired to carry the sleeve completely down upon the bottle neck wherein it will serve to seal and protect the tax stamp customarily applied to bottles containing alcoholic beverages. The particular extent of downward motion of the suction pads 512 may be determined by adjustment of the bracket 680 through the adjustment knob 693 (see Fig. 62). It will be recalled that this adjustment serves to raise or lower the short, horizontal section 683 of the adjustable portion 669 of the sleeve delivery track and thus serves to limit the downward extent of travel of the suction pads 512 for the purpose just described.

After the sleeve X has reached desired position on the bottle neck, suction is cut off from the suction pads 512 by operation of the valve mechanism shown in Figs. 6 and 7. As described above in connection with said Figs. 6 and 7, the suction pads 512 are vented to the atmosphere through the port 622 whereby it is assured that the suction pads will cease to adhere to the sleeve. At this same time the suction pad control roller 533 engages the incline 739 on the track portion 703 (see Fig. 64) causing separation of the suction pads from the sleeve X. As the carrier 12 continues to move toward the left as viewed in Fig. 64 and Fig. 8, the roller 544 engages the upwardly inclined section 686 of the sleeve delivery track 546 causing the suction pads to raise away from the bottle into the position shown in full lines in Fig. 77. The bottle is now free to travel along the conveyor 20 for discharge from the machine as indicated in Fig. 1. From an inspection of Fig. 77 it will be observed that the sleeve X is now loosely disposed upon the bottle neck at the desired vertical position. Within a very short time the sleeve X will dry and shrink tightly into engagement with the bottle neck as will be understood by those skilled in the art.

As the carrier 12 continues its movement, the finger control roller 476 engages a portion of the finger control track 640 (see Fig. 59) which is concentric with the right-hand shaft 56 (left-hand as viewed in Fig. 59). Referring next to Fig. 8, it will be observed that this portion of the track 640 is provided with an incline 479 which moves the roller 476 upwardly to such a position as to fully collapse the fingers 470. The fingers 470, as described above, are moved to partially collapsed position when the roller 476 is in engagement with the section 646 of the finger control track and return to expanded position after the sleeve X has been removed therefrom. The fully collapsed position into which the fingers 470 are moved as the carrier moves around the left-hand end of the machine as viewed in Fig. 8, is such that the latch 494 (see Figs. 57 and 58) drops over the catch 498 whereby to latch the fingers 470 in their fully collapsed position wherein they remain until a new, opened sleeve X is presented thereto by the transfer mechanism as described hereinabove. The operation just described is brought about by the upward movement of the cam 482 between the cam surfaces 484, such upward movement being effective to separate the arms 486 and thus to collapse the fingers 470 carried thereby in crossed relationship. The cam 482 is raised to the position shown in dotted lines in Fig. 57 at which time the latch 494 operates as described above. It is now necessary to move the cam 482 downwardly into the full line position shown in Fig. 57 in order that the fingers 470 may be free to expand when the suction head 198 strikes the stop screw 502 incident to the positioning of a new sleeve X upon the fingers 470 as shown in Fig. 58. In order to assure that the cam 482 will be moved downwardly, an inclined cam 481 (see Fig. 2) is disposed above the downwardly inclined section of the cam portion 479. The downwardly inclined cam 481 is effective to depress the roller 476 against such resistance as the cam 482 may offer.

Continued movement of the carrier 12 from right to left as viewed in Fig. 2 is effective to bring such carrier to the position in which it is temporarily stopped by movement of the carriage C for the positioning thereon of a new sleeve X simultaneously, of course, with such other carriers 12 as may be stopped for cooperation with the magazines M. In the present illustration three carriers 12 are stopped for cooperation with three magazines M. The cycle of operation of such a group of carriers is now complete.

From the above detailed description it will be apparent that there is provided mechanism for accomplishing the objects of the present invention. Such detailed description and the language used therein are intended to be illustrative rather than limiting in nature inasmuch as it will be understood that modification and variations in detail may be resorted to by those skilled in the art within the scope of the appended claims.

We claim:

1. In a machine for applying banding sleeves to containers, the combination of a first, a second and a third conveyor, means for driving said first conveyor at a predetermined linear speed, means for driving said second conveyor at a linear speed greater than that of said first conveyor, means for supplying to said second conveyor a series of containers in definitely spaced relation, a plurality of sleeve-applying units carried by said first conveyor adapted individually to apply banding sleeves to the containers carried by said second conveyor, means for driving said third conveyor at a linear speed equal to the linear speed of said sleeve-applying units, and a plurality of arms spaced around said third conveyor, the space therebetween being equal to the spacing between adjacent sleeve-applying units on said first conveyor, portions of the paths of said second and third conveyors intersecting whereby said arms are projected into engagement with individual containers carried by said second conveyor, said second and third conveyors together being effective to move said containers at a linear speed equal to that of said sleeve-applying units and individually in accurate alignment therewith for the reception of banding sleeves from said units.

2. In a machine for applying banding sleeves to containers, the combination of a first conveyor, a plurality of sleeve-applying units uniformly spaced around said first conveyor, means defining a closed path for said conveyor including a straight-line portion of such a length as to include a plurality of said sleeve-applying units, means for driving said conveyor in such manner that the sleeve-applying units within said straight-line portion are moved continuously at a predetermined linear speed, a second conveyor adapted to support and move a series of containers through a straight-line path vertically aligned with and beneath said straight-line portion of the path of said first conveyor, means for driving said second conveyor at a linear speed greater than that of said sleeve-applying units, a third conveyor, a plurality of arms spaced around said third conveyor, the spacing therebetween being equal to the spacing between adjacent sleeve-applying units on said first conveyor, means for driving said third conveyor at a linear speed equal to that of said sleeve-applying units within said straight-line portion of the path of said first conveyor, means for supplying containers to said second conveyor in spaced relation such that a container will be brought into engagement with each of the arms on said third conveyor and held thereby in vertical alignment with a sleeve-applying unit, and means for individually operating each of said sleeve-applying units to apply a banding sleeve to the container aligned therewith.

3. In a machine for applying banding sleeves to containers, an endless flexible conveyor movable through a closed path; a plurality of sleeve carriers carried by said conveyor in positions equally spaced throughout the length thereof; a plurality of magazines in a first zone of said band-applying machine for holding bulk supplies of banding sleeves in flattened form with the inner faces thereof in face-to-face contact, a plurality of units simultaneously operable to remove a banding sleeve from each of said magazines and to open each of said banding sleeves in a position for engagement by one of said sleeve carriers, and means for operating said units to apply the banding sleeves carried thereby respectively to the sleeve carrier with which each of said units is associated; means for driving the portion of said conveyor extending adjacent said units step by step in increments equal to the sum of the distances between a plurality of said sleeve carriers greater by one than said plurality of units and for maintaining said portion of said conveyor stationary during operation of said units to apply opened banding sleeves to said carriers, said driving means driving another portion of said conveyor continuously through a second zone of said band applying machine; a second conveyor operative continuously to move a plurality of containers through said second zone, said containers being spaced and positioned upon said second conveyor so as to position an end of each container in alignment with one of said sleeve carriers as the latter pass through said second zone; and means for successively operating said carriers to apply the opened banding sleeve carried thereby to the container aligned therewith.

4. In a device for opening banding sleeves made of flexible material and having the inner surfaces of the opposed walls thereof flattened into face to face contact, the combination of a frame, a first suction head, means mounting said first suction head for movement relative to said frame and forward and backward in a predetermined path, said first suction head having a substantially planar perforated suction face disposed substantially normally to a predetermined portion of said path and being adheringly engageable with the exterior surface of one of the walls of a flattened banding sleeve, a second suction head, means for mounting said second suction head for movement relative to said frame and forward and backward in a predetermined path coinciding with at least a part of said predetermined portion of the path of said first suction head, resilient means urging said second suction head forwardly toward said first suction head into a predetermined position within said coinciding paths of travel, said second suction head having a substantially planar perforated suction face in opposed substantially parallel relationship with the face of said first suction head, means for moving said first suction head forwardly with the flattened banding sleeve adhered thereto first to engage the exterior surface of the opposite wall of said banding sleeve with the suction face of said second suction head and then to displace said second suction head backwardly in its path of travel against said resilient means by pressure exerted through said banding sleeve, means for creating suction in said second suction head to cause the surface of said banding sleeve in engagement therewith to adhere thereto, and means for moving said first suction head backwardly in its path of travel to cause separation of said suction heads and to open said banding sleeve.

5. In a machine for applying banding sleeves to containers, the combination of a plurality of magazines each adapted to contain a bulk supply of banding sleeves made of flexible material and having the inner surfaces of the opposed walls thereof flattened into face-to-face contact and each magazine being adapted to present successively and individually a banding sleeve in a predetermined position; a transfer mechanism comprising a plurality of movable suction heads one for each magazine, means for moving said suction heads simultaneously into contact with a banding sleeve presented by each of said magazines, each of said suction heads being provided with a substantially planar surface having a plurality of suction apertures therein whereby to engage a banding sleeve and remove the same from a magazine, a plurality of second suction heads one for each of said first suction heads, means for moving said first suction heads away from said magazines to carry the banding sleeves adhered thereto respectively into engagement with said second suction heads, means for thereafter causing a movement of separation between said respective first and second suction heads to open each of said banding sleeves in a predetermined position, a conveyor having a plurality of carriers thereon greater in number than the number of said magazines, and means for driving said conveyor whereby to present intermittently and successively groups of said carriers equal in number to the number of said magazines in positions for receiving opened banding sleeves presented in said predetermined positions by said suction heads.

6. In a machine for applying banding sleeves to containers, the combination of a plurality of magazines each adapted to contain a bulk supply of banding sleeves made of flexible material and having the inner surfaces of the opposed walls thereof flattened into face-to-face contact and each magazine being adapted to present successively and individually a banding sleeve in a predetermined position; a transfer mechanism comprising a plurality of movable suction heads one for each magazine, means for moving said suction heads simultaneously into contact with a banding sleeve presented by each of said magazines, each of said suction heads being provided with a substantially planar surface having a plurality of suction apertures therein whereby to engage a banding sleeve and remove the same from a magazine, a plurality of second suction heads one for each of said first suction heads, means for moving said first suction heads away from said magazines to carry the banding sleeves adhered thereto respectively into engagement with said second suction heads, means for thereafter causing a movement of separation between said respective first and second suction heads to open each of said banding sleeves in a predetermined position, a conveyor having a plurality of carriers thereon greater in number than the number of said magazines, means for driving said conveyor whereby to present intermittently and successively groups of said carriers equal in number to the number of said magazines in positions for receiving opened banding sleeves presented in said predetermined positions by said suction heads, said conveyor driving means being effective to move said carriers away from said predetermined positions and to move said carriers continuously through a predetermined path of travel; means for continuously moving a series of containers in individual alignment with said carriers within said predetermined path of travel, and means for operating said carriers to position the banding sleeves carried thereby upon said containers.

7. In a machine for applying banding sleeves to bottles having neck and body portions, the combination of a first, a second and a third conveyor, means for driving said first conveyor at a predetermined linear speed, means for driving said second conveyor at a linear speed greater than that of said first conveyor, means for supplying to said second conveyor a series of bottles in definitely spaced relation, sleeve-applying units carried by said first conveyor adapted individually to apply banding sleeves to the bottles carried by said second conveyor, means for driving said third conveyor at a linear speed equal to the linear speed of said sleeve-applying units, and a plurality of arms mounted on said third conveyor and projecting over said second conveyor in positions respectively to engage the bodies and neck portions of said bottles to hold said bottles at a linear speed equal to that of said sleeve-applying units and individually in accurate alignment therewith for the positioning on the necks thereof of banding sleeves carried by said units.

8. In a machine for applying banding sleeves to bottles having neck and body portions, the combination of a first, a second and a third conveyor; means for driving said first conveyor at a predetermined linear speed; means for driving said second conveyor at a linear speed greater than that of said first conveyor; means for supplying to said second conveyor a series of bottles in definitely spaced relation; sleeve-applying units carried by said first conveyor adapted individually to apply banding sleeves to the bottles carried by said second conveyor; means for driving said third conveyor at a linear speed equal to the linear speed of said sleeve-applying units; and a plurality of arms mounted on said third conveyor, there being at least two sets of said arms spaced along said third conveyor at intervals equal to the intervals between the sleeve-applying units on said first conveyor, one set of said arms extending over said second conveyor in a position to engage the bodies of said bottles and another set of said arms extending over said second conveyor in position to engage the necks of said bottles, at least the set of arms positioned for engagement with the necks of the bottles having generally V-shaped notches formed therein into which the necks of said bottles are urged by said second conveyor whereby accurately to align said necks with the sleeve-applying units on said first conveyor for the reception of banding sleeves from said units.

9. In a device for applying banding sleeves to containers, the combination of banding sleeve holding means including suction means engageable with opposed exterior surface portions of a banding sleeve to hold said banding sleeve in opened position, a pair of fingers adapted to be positioned within said opened banding sleeve in telescoped relation therewith, said fingers being mounted for movement relative to one another into a collapsed position facilitating the positioning thereof in said opened banding sleeve and into an expanded position in which they are effective to engage interior surface portions of said banding sleeve to hold the same in opened position, resilient means urging said fingers toward said expanded position, means for moving said fingers into said collapsed position, latch means for holding said fingers in said collapsed position, means for causing relative movement between said banding sleeve holding means and said fingers to position said opened banding sleeve in telescoped relation with said fingers while said latch means is effective to hold said fingers in collapsed position, and means carried by said banding sleeve holding means for engaging and releasing said latch means when said opened banding sleeve reaches a predetermined telescoped relation with said fingers.

10. In a machine for opening banding sleeves made of flexible material with the inner surfaces of opposed walls flattened into face-to-face contact, the combination with a pair of opposed relatively movable suction heads adapted to engage opposite exterior surfaces of the walls of a banding sleeve for opening said banding sleeve into substantially cylindrical form, and means insertable into said opened banding sleeves for removing the same from said suction heads, of means for removing from one of said suction heads any sleeve adhering thereto as a result of failure to open, said last-named means comprising a movable arm disposed adjacent said suction head, and means for moving said arm relative to said suction head to strike any such unopened sleeve.

11. In a machine for opening banding sleeves made of flexible material with the inner surfaces of opposed walls flattened into face-to-face contact, the combination with a pair of opposed relatively movable suction heads adapted to engage opposite exterior surfaces of the walls of a banding sleeve for opening said banding sleeve into substantially cylindrical form, said suction heads having suction faces of an area substantially less than that of the sleeve walls with which said suction heads are respectively engageable, and means insertable into said opened banding sleeves for removing the same from said suction heads, of means for stripping from one of said suction heads any sleeve remaining adhered thereto as a result of failure to open, said last-named means comprising a lever mounted adjacent said suction head for pivotal movement relative thereto, and means for moving said lever into a position wherein it will strike a portion of any such unopened sleeve extending beyond the area of the suction face of said suction head and thereby strip such sleeve from said suction head.

12. In a device for applying to containers banding sleeves made of flexible material and having the inner surfaces of opposed walls flattened into face-to-face contact, the combination of an endless flexible conveyor, a plurality of carriers spaced uniformly around said conveyor and adapted to receive opened banding sleeves and to apply said banding sleeves to containers; means for opening banding sleeves for application to said carriers, said opening means comprising a first suction head, a second suction head, means for moving said first suction head to a position to adheringly engage one exterior wall of a flattened banding sleeve and to a position presenting the opposite exterior wall of said flattened banding sleeve to said second suction head, and means for separating said suction heads with the exterior walls of said banding sleeves adhered respectively thereto to open said sleeve into substantially cylindrical form; means for moving said suction heads to carry said opened banding sleeve into position to be received by one of said carriers; and means comprising a movable arm mounted adjacent one of said suction heads for stripping from said suction head any sleeve remaining adhered thereto as a result of failure to open.

13. In a device for applying to containers banding sleeves made of flexible material and having the inner surfaces of opposed walls flattened into face-to-face contact, the combination of an endless flexible conveyor, a plurality of carriers spaced uniformly around said conveyor and adapted to receive opened banding sleeves and to apply said banding sleeves to containers; means for opening banding sleeves for application to said carriers, said opening means comprising a first suction head, a second suction head, means for moving said first suction head to a position to adheringly engage one exterior wall of a flattened banding sleeve and to a position presenting the opposite exterior wall of said flattened banding sleeve to said second suction head, each of said suction heads having substantially planar suction faces having an area substantially less than that of the exterior wall of the flattened banding sleeve with which said suction heads are respectively engageable whereby portions of said banding sleeve will extend beyond said suction faces, and means for separating said suction heads with the exterior walls of said banding sleeves adhered respectively thereto to open said sleeve into substantially cylindrical form; means for moving said suction heads to carry said opened banding sleeve into position to be received by one of said carriers; and means comprising a movable arm mounted adjacent one of said suction heads in such position as to engage unsupported portions of a banding sleeve remaining adhered to said suction head as a result of failure to open whereby to strip said unopened sleeve from said suction head.

HOWARD G. ALLEN.
GEORGE E. GAMPP.
H. D. SMITH.

References Cited in the file of this patent
UNITED STATES PATENTS

| Number | Name | Date |
|---|---|---|
| 573,952 | Wurtz | Dec. 29, 1896 |
| 1,589,800 | Frank | June 22, 1926 |
| 1,672,278 | Oslund et al. | June 5, 1928 |
| 1,835,336 | Risser | Dec. 8, 1931 |
| 2,010,994 | Irmscher | Aug. 13, 1935 |
| 2,036,105 | Strout | Mar. 31, 1936 |
| 2,042,858 | Nicolas | June 2, 1936 |
| 2,051,483 | Jones | Aug. 18, 1936 |
| 2,068,107 | Nygard | Jan. 19, 1937 |
| 2,089,769 | Strout | Aug. 10, 1937 |
| 2,103,302 | Strout | Dec. 28, 1937 |
| 2,192,982 | Meendsen | Mar. 12, 1940 |
| 2,281,516 | Royal | Apr. 28, 1942 |
| 2,390,901 | Schramm | Dec. 11, 1945 |
| 2,579,458 | Allen et al. | Dec. 25, 1951 |